US012784651B2

(12) United States Patent
Won

(10) Patent No.: US 12,784,651 B2
(45) Date of Patent: Nov. 3, 2026

(54) DISPLAY APPARATUS

(71) Applicant: LG DISPLAY CO., LTD., Seoul (KR)

(72) Inventor: Heejin Won, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 619 days.

(21) Appl. No.: 18/223,773

(22) Filed: Jul. 19, 2023

(65) Prior Publication Data

US 2024/0029633 A1 Jan. 25, 2024

(30) Foreign Application Priority Data

Jul. 22, 2022 (KR) ........................ 10-2022-0090957

(51) Int. Cl.
*G09G 3/32* (2016.01)

(52) U.S. Cl.
CPC ...................................... *G09G 3/32* (2013.01)

(58) Field of Classification Search
CPC ... G09G 2300/0413; G09G 2300/0426; H10K 59/131; H10K 59/88; H10K 77/111; H10K 2102/311
See application file for complete search history.

(56) References Cited

U.S. PATENT DOCUMENTS

| | | | | |
|---|---|---|---|---|
| 2017/0287394 A1* | 10/2017 | Kim | .................... | H10K 59/131 |
| 2018/0301520 A1* | 10/2018 | Jin | ....................... | H10K 77/111 |
| 2020/0401274 A1* | 12/2020 | Moon | .................... | G06F 3/045 |

FOREIGN PATENT DOCUMENTS

| | | |
|---|---|---|
| KR | 10-2017-0114034 | 10/2017 |
| KR | 10-2018-0115395 | 10/2018 |
| KR | 10-2020-0145922 | 12/2020 |

* cited by examiner

*Primary Examiner* — Nathan Milakovich
(74) *Attorney, Agent, or Firm* — PnK IP LLC

(57) ABSTRACT

A display apparatus includes a substrate including a display area, a first non-display area, and a second non-display area including a bending region, a pixel part including pixels at the display area, a gate driving circuit disposed at the first non-display area and electrically connected to the pixel part, a first routing line portion including a plurality of first routing lines electrically connected to the pixel part and configured to pass through the bending region, and a second routing line portion including a plurality of second routing lines electrically connected to the gate driving circuit and configured to pass through the bending region, and the second routing line portion includes a plurality of routing groups including one or more second routing lines and a dummy line portion disposed at a bending region between the plurality of routing groups, the dummy line portion including one or more dummy lines.

17 Claims, 9 Drawing Sheets

DISPLAY APPARATUS

CROSS-REFERENCE TO RELATED APPLICATION

This application claims the priority of Korean Patent Application No. 10-2022-0090957 filed on Jul. 22, 2022, which is hereby incorporated by reference in its entirety.

BACKGROUND

Field of the Disclosure

The present disclosure relates to a display apparatus.

Description of the Background

Display apparatuses are equipped in home appliances or electronic devices, such as televisions (TVs), monitors, notebook computers, smartphones, tablet computers, electronic pads, wearable devices, watch phones, portable information devices, navigation devices, and automotive control display apparatuses, and are used as a screen for displaying an image.

In display apparatuses, liquid crystal display apparatuses, light emitting display apparatuses, and electrophoresis display apparatuses may be thinned, and thus, research and development for implementing the display apparatuses as flexible display apparatuses are being done. In the flexible display apparatuses, lines and a display part or the like including a thin film transistor (TFT) are provided on a flexible substrate having flexibility, and even when being bent like paper, an image may be displayed. Accordingly, the flexible display apparatuses may be applied to various display fields.

Recently, rollable display apparatuses or foldable display apparatuses each using advantages of flexible display apparatuses capable of being bent or folded may provide a large screen of a display part while maintaining portable convenience, and thus, are attracting much attention as next-generation display apparatuses. Also, flexible display apparatuses including a flexible display panel may decrease a non-display area (or a bezel area) through bending of a bending region, and thus, are being widely used as display screens of various electronic devices.

SUMMARY

The inventor of the present disclosure has recognized a problem where one or more lines are disconnected or a crack occurs in one or more lines among signal lines provided in a bending region of a flexible display panel due to a bending stress applied to the bending region when the bending region is bent at a certain curvature or is maintained in a state where the bending region is bent at a certain curvature, and due to this, the reliability (or bending reliability) of the signal lines provided in the bending region of the flexible display panel is reduced. To solve such a problem, the inventor has continuously performed various experiments, and based on the various experiments, has invented a display apparatus having a new structure where the reliability (or bending reliability) of the signal lines provided in the bending region of the flexible display panel is enhanced.

Moreover, the inventor of the present disclosure has recognized that shapes and/or electrical characteristics of some of the signal lines provided in the bending region of the flexible display panel differ. To solve such a problem, the inventor has continuously performed various experiments, and based on the various experiments, has invented a display apparatus having a new structure where a deviation of shapes and/or electrical characteristics of signal lines provided in the flexible display panel is reduced.

An aspect of the present disclosure provides a display apparatus where reliability is enhanced.

An aspect of the present disclosure provides a display apparatus where the reliability (or bending reliability) of signal lines provided in a bending region of a flexible display panel is enhanced.

An aspect of the present disclosure provides a display apparatus where a deviation of shapes and/or electrical characteristics of signal lines provided in a flexible display panel is reduced.

Additional features and aspects of the disclosure will be set forth in the description that follows, and in part will become apparent from the description or may be learned by practice of the inventive concepts provided herein. Other features and aspects of the inventive concepts may be realized and attained by the structure particularly pointed out in the written description, or derivable therefrom, and claims hereof as well as the appended drawings.

To achieve these and other aspects of the present disclosure, as embodied and broadly described, a display apparatus includes a substrate including a display area, a first non-display area surrounding the display area, and a second non-display area including a bending region extending from at least a portion of the first non-display area; a pixel part including a plurality of pixels in the display area of the substrate; a gate driving circuit disposed in the first non-display area of the substrate and electrically connected to the pixel part; a first routing line portion including a plurality of first routing lines electrically connected to the pixel part and configured to pass through the bending region; and a second routing line portion including a plurality of second routing lines electrically connected to the gate driving circuit and configured to pass through the bending region, wherein the second routing line portion comprises a plurality of routing groups including one or more second routing lines of the plurality of second routing lines; and a dummy line portion disposed in a bending region between the plurality of routing groups, the dummy line portion including one or more dummy lines.

In another aspect of the present disclosure, a display apparatus comprises a substrate including a display area and a non-display area; a pixel part including a plurality of pixels in the display area of the substrate; a gate driving circuit disposed in the non-display area of the substrate and electrically connected to the pixel part; a first routing line portion including a plurality of first routing lines disposed in the non-display area of the substrate and electrically connected to the pixel part; a second routing line portion including a plurality of second routing lines disposed in the non-display area of the substrate and electrically connected to the gate driving circuit; and a guard line disposed in the non-display area of the substrate and between the first routing line portion and the second routing line portion.

Specific details according to various examples of the present disclosure other than the means for solving the above-mentioned problems are included in the description and drawings below.

According to a technical solution for the technical problem, an aspect of the present disclosure provides a display apparatus where reliability is enhanced.

According to a technical solution for the technical problem, an aspect of the present disclosure provides a display apparatus where the reliability (or bending reliability) of signal lines provided in a bending region of a flexible display panel is enhanced.

According to a technical solution for the technical problem, an aspect of the present disclosure provides a display apparatus where a deviation of shapes and/or electrical characteristics of signal lines provided in a flexible display panel is reduced.

The details of the present disclosure described in technical problem, technical solution, and advantageous effects do not specify essential features of claims, and thus, the scope of claims is not limited by the details described in detailed description of the disclosure.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing general description and the following detailed description of the present disclosure are exemplary and explanatory, and are intended to provide further explanation of the disclosures as claimed.

BRIEF DESCRIPTION OF THE DRAWINGS

The accompanying drawings, which are included to provide a further understanding of the disclosure, are incorporated in and constitute a part of this disclosure, illustrate aspects and aspects of the disclosure and together with the description serve to explain principles of the disclosure.

Figure 1:
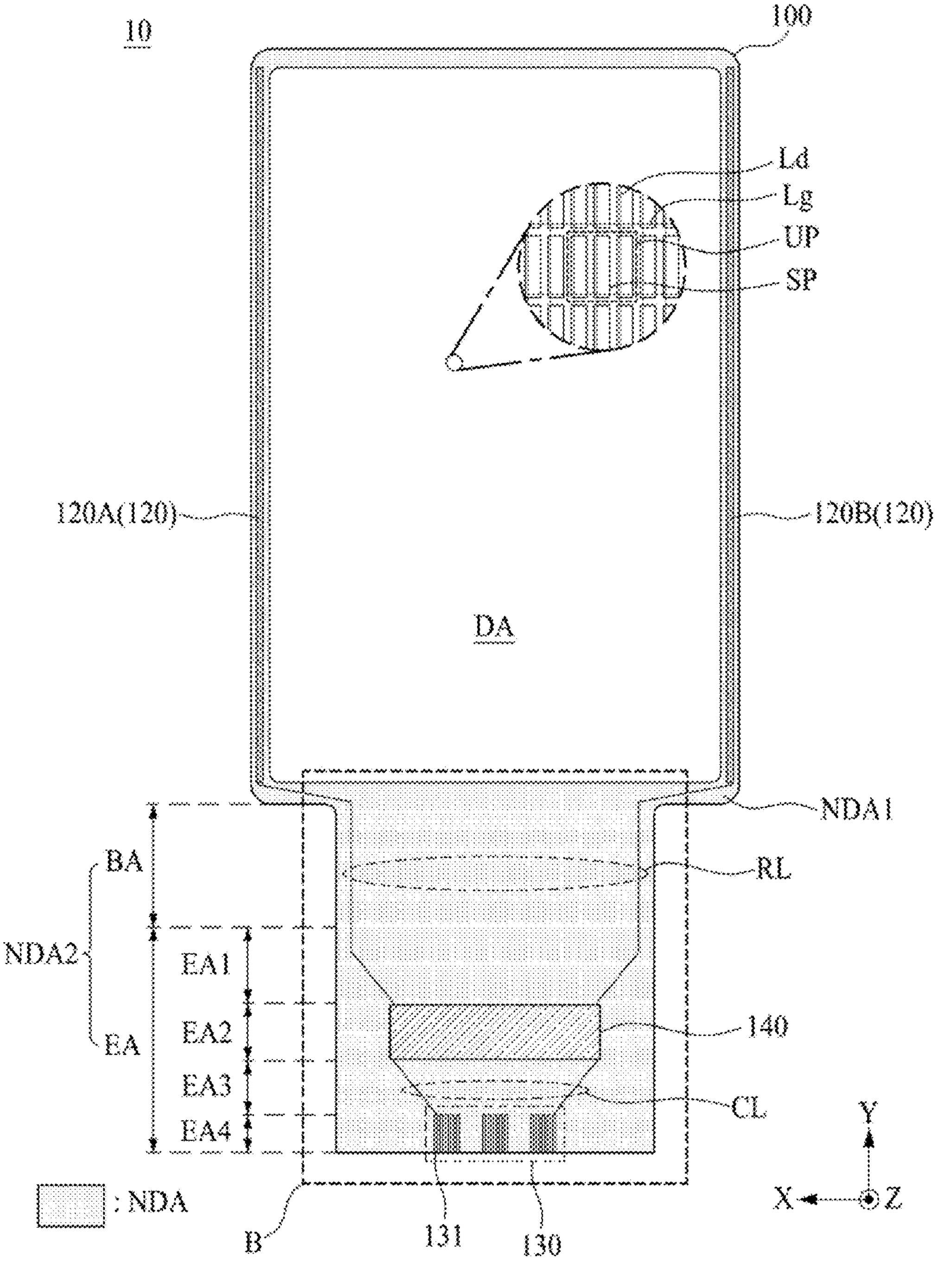
FIG. 1 is a plan view illustrating a display apparatus according to an aspect of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof may be exaggerated for clarity, illustration, and convenience.

DETAILED DESCRIPTION

Reference will now be made in detail to aspects of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Same reference numerals designate same elements throughout. Names of the respective elements used in the following explanations are selected only for convenience of writing the disclosure and may be thus different from those used in actual products.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are examples and are provided so that this disclosure may be thorough and complete to assist those skilled in the art to understand the inventive concepts without limiting the protected scope of the present disclosure.

A shape, a size, a ratio, an angle, and a number disclosed in the drawings for describing aspects of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When “comprise,” “have,” and “include” described in the present disclosure are used, another part may be added unless “only” is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, “on”, “over”, “under”, and “next”, one or more other parts may be disposed between the two parts unless a more limiting term, such as “just” or “direct(ly)” is used. In the description of aspects, when a structure is described as being positioned “on or above or over” or “under or below” another structure, this description should be construed as including a case in which the structures contact each other as well as a case in which a third structure is disposed therebetween.

In describing a time relationship, for example, when the temporal order is described as, for example, “after”, “subsequent”, “next”, and “before”, or the like, a case that is not continuous may be included unless a more limiting term, such as "just", "immediate(ly)", or "direct(ly)" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first", "second", "A", "B", "(a)", "(b)", etc. may be used. These terms are intended to identify the corresponding elements from the other elements, and basis, order, or number of the corresponding elements should not be limited by these terms. The expression that an element or layer is "connected," "coupled," or "adhered" to another element or layer means the element or layer may not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The expression of a first element, a second elements and/or a third element should be understood as one of the first, second and third elements or as any or all combinations of the first, second and third elements. By way of example, A, B and/or C may refer to only A; only B; only C; any or some combination of A, B, and C; or all of A, B, and C.

Features of various aspects of the present disclosure may be partially or overall coupled to or combined with each other, and may be variously inter-operated with each other and driven technically as those skilled in the art may sufficiently understand. Aspects of the present disclosure may be carried out independently from each other, or may be carried out together in co-dependent relationship.

Hereinafter, aspects of the present disclosure will be described in detail with reference to the accompanying drawings. For convenience of description, a scale of each of elements illustrated in the accompanying drawings differs from a real scale, and thus, is not limited to a scale illustrated in the drawings.

The display apparatus according to an aspect of the present disclosure may be a flexible display apparatus, a display panel, or a flexible display panel, but aspects of the present disclosure are not limited thereto. For example, the display apparatus according to an aspect of the present disclosure may include a set electronic apparatus or a set device (or a set apparatus) such as a notebook computer, a television, a computer monitor, an equipment apparatus including an automotive apparatus or another type apparatus for vehicles, or a mobile electronic apparatus such as a smartphone or an electronic pad, which is a complete product (or a final product) including a liquid crystal display panel or an organic light emitting display panel, or the like.

Figure 2:
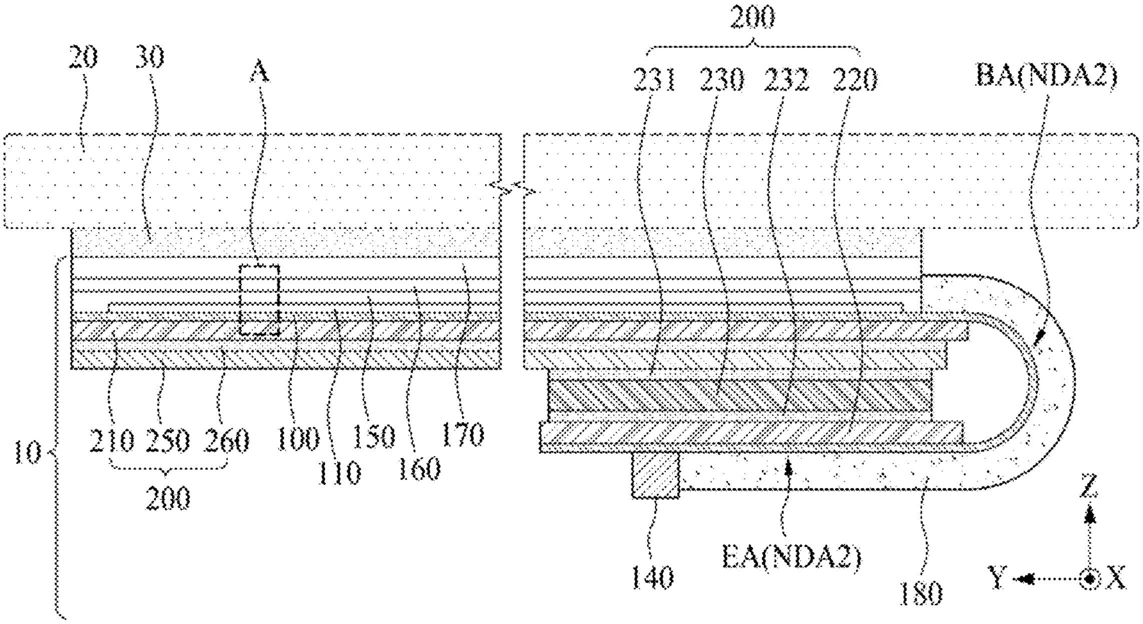
FIG. 2 is a cross-sectional view illustrating the display apparatus according to an aspect of the present disclosure.

FIG. 1 is a plan view illustrating a display apparatus 10 according to an aspect of the present disclosure. FIG. 2 is a cross-sectional view illustrating the display apparatus 10 according to an aspect of the present disclosure.

With reference to FIGS. 1 and 2, the display apparatus (or a display panel) 10 according to an aspect of the present disclosure may include a shape where a portion thereof is bent as illustrated in FIG. 2. FIG. 1 illustrates a shape where the display apparatus (or the display panel) according to an aspect of the present disclosure is not bent.

The display apparatus (or a display panel) 10 according to an aspect of the present disclosure may include a substrate 100 which includes a display area DA and a non-display area NDA.

The substrate 100 may be a base member or a base substrate for supporting or forming various elements of the display apparatus 10. The substrate 100 may be configured as a material having flexibility. The substrate 100 according to an aspect of the present disclosure may be configured as a plastic material such as polyimide and the like, but aspects of the present disclosure are not limited thereto. For example, the substrate 100 according to another aspect of the present disclosure may be configured as a thin glass material having flexibility. For example, the substrate 100 may be a base substrate, a flexible substrate, or a plastic substrate.

The display area DA may be an area which displays an image. For example, the display area DA may be a display part, a display portion, an active portion, an active area, or an active part.

The non-display area NDA may be an area which does not display an image. The non-display area NDA may be a peripheral region of the display area DA. For example, the non-display area NDA may be implemented to surround the display area DA. For example, the non-display area NDA may be a non-display part, a non-display portion, an inactive region, an inactive part, an inactive portion, a peripheral part, a peripheral portion, or a peripheral region. For example, the display area DA may be a flat region or a flat portion.

The non-display area NDA according to an aspect of the present disclosure may include a first non-display area NDA1 and a second non-display area NDA2.

The first non-display area NDA1 may be implemented to surround the display area DA. For example, the first non-display area NDA1 may include a region which extends from the display area DA. For example, the first non-display area NDA1 may include a region which extends to have a certain width from each side of the display area DA. For example, the first non-display area NDA1 may be a flat region or a flat portion. For example, the first non-display area NDA1 may be a first flat region or a first flat portion together with the display area DA.

The first non-display area NDA1 may include a pair of short-side regions parallel to a first direction X and a pair of long-side regions parallel to a second direction Y intersecting with the first direction X. For example, the pair of long-side regions of the first non-display area NDA1 may be folded or bent toward a rear surface of the display area DA, and thus, the display apparatus may decrease in bezel width of the long-side region. For example, the pair of long-side regions of the first non-display area NDA1 may be a long-side bending region or a bezel bending region.

A long-side region of the display area DA adjacent to the pair of long-side regions of the first non-display area NDA1 may be bent to have a certain curvature together with the pair of long-side regions of the first non-display area NDA1. Accordingly, the long-side region of the display area DA may be implemented to have a certain curvature. For example, the long-side region of the display area DA having the certain curvature may be an active bending region, a curved display area, or a bending display area.

The second non-display area NDA2 may include a region which extends from one side of the first non-display area NDA1. The second non-display area NDA2 may include a region which extends from at least a portion of one short side of the first non-display area NDA1 to have a certain length along the second direction Y. For example, the second non-display area NDA2 may extend from a center portion of the one short side of the first non-display area NDA1 to have a certain width and a certain length. For example, a width of the second non-display area NDA2 parallel to the first direction X may be smaller than a width of the display area DA or a width of the first non-display area NDA1 parallel to the first direction X. For example, the second non-display area NDA2 may be an extension portion, a protrusion portion, an enlarged portion, a routing portion, a signal transfer portion, a protrusion region, an enlarged region, a routing region, or a signal transfer region.

The second non-display area NDA2 according to an aspect of the present disclosure may include a bending region BA and an extension region EA.

The bending region BA may include a region which extends from one side of the first non-display area NDA1. The bending region BA may be bent from the one side of the first non-display area NDA1 to have a certain curvature. For example, the bending region BA may be bent toward a rear surface of the first non-display area NDA1 (or a substrate 100) from the one side of the first non-display area NDA1, but aspects of the present disclosure are not limited thereto. For example, the bending region BA may be bent from the one side of the first non-display area NDA1 to have a semicircular shape, but aspects of the present disclosure are not limited thereto. For example, the bending region BA may be a non-planar portion, a non-flat portion, a bending portion, a curved portion, a curvature portion, a bending line portion, or a bending line region.

The extension region EA may extend along the second direction Y from the bending region BA. The extension region EA may overlap with the display area DA. For example, the extension region EA may be disposed under a rear surface of the substrate 100 and may face the rear surface of the substrate 100. For example, the extension region EA may overlap with the first non-display area NDA1 and a portion of the display area DA adjacent to the first non-display area NDA1.

The extension region EA may include one or more extension regions EA1 to EA4 which extend along the second direction Y from the bending region BA. For example, the extension region EA may include first to fourth extension regions EA1 to EA4 which extend along the second direction Y from the bending region BA. For example, the extension region EA may be a circuit portion, a circuit connection portion, a circuit arrangement portion, a circuit region, a circuit connection region, or a circuit arrangement region. For example, the extension region EA may be a flat region or a flat portion. For example, the extension region EA may be a second flat region or a second flat portion.

The first extension region EA1 of the one or more extension regions EA1 to EA4 may extend from the bending region BA. For example, with respect to the second direction Y, an extension length of the first extension region EA1 may be equal to or different from a length of the bending region BA. For example, with respect to the second direction Y, the extension length of the first extension region EA1 may be smaller than the length of the bending region BA, but aspects of the present disclosure are not limited thereto. For example, the first extension region EA1 may be a circuit region, a line region, a signal transfer region, or a routing region.

The second extension region EA2 of the one or more extension regions EA1 to EA4 may extend from the first extension region EA1. For example, with respect to the second direction Y, an extension length of the second extension region EA2 may be equal to or different from the length of the first extension region EA1. For example, the second extension region EA2 may be a circuit region, a circuit arrangement region, a circuit mount region, or a chip mount region.

The third extension region EA3 of the one or more extension regions EA1 to EA4 may extend from the second extension region EA2. For example, with respect to the second direction Y, an extension length of the third extension region EA3 may be equal to or different from the length of the first extension region EA1. For example, the third extension region EA3 may be a circuit region, a line region, or a signal transfer region.

The fourth extension region EA4 of the one or more extension regions EA1 to EA4 may extend from the third extension region EA3. For example, with respect to the second direction Y, an extension length of the fourth extension region EA4 may be equal to or different from the length of the first extension region EA1. For example, the fourth extension region EA4 may be a circuit coupling portion, a circuit connection portion, a circuit coupling region, a circuit connection region, a pad region, or a signal input/output region.

The display apparatus (or the display panel) 10 according to an aspect of the present disclosure may further include a pixel part 110, a gate driving circuit 120, a pad part 130, and a display driving circuit 140.

The pixel part 110 may be implemented in the display area DA of the substrate 100 and may display a black image or a color image. For example, the pixel part 110 may be a pixel layer, a pixel array, a pixel array layer, or a pixel array part.

The pixel part 110 may include a plurality of pixels UP disposed in the display area DA. The plurality of pixels UP may be respectively implemented in pixel areas provided by a plurality of gate lines Lg and a plurality of data lines Ld.

When the display apparatus 10 according to an aspect of the present disclosure is a light emitting display apparatus, the pixel part 110 may be configured to include a light emitting device having an emission structure (or a light emitting structure). For example, the emission structure may include a light emitting layer (or an organic light emitting layer), but aspects of the present disclosure are not limited thereto and the emission structure may include an inorganic light emitting layer (or an inorganic light emitting diode). When the display apparatus 10 according to an aspect of the present disclosure is a liquid crystal display (LCD) apparatus, the pixel part 110 may be configured to include a liquid crystal layer. Hereinafter, for convenience of description, it may be assumed that the display apparatus 10 is an organic light emitting display apparatus, but aspects of the present disclosure are not limited thereto.

Each of the plurality of pixels UP may be configured to implement a black image or a color image. One pixel UP may be a unit pixel. Each of the plurality of pixels UP may include a plurality of subpixels SP. For example, each of the plurality of subpixels SP may be configured to implement one of a plurality of colors (or light) implementing a color image (or color light). For example, each of the plurality of subpixels SP may be configured to include a light emitting device implementing any one of red light, green light, blue light, and white light. For example, each of the plurality of pixels UP may implement an image through a plurality of subpixels SP arranged as a stripe type, or may implement an image through a plurality of subpixels SP arranged as a pentile type.

The gate driving circuit 120 may be implemented in the non-display area NDA adjacent to the display area DA to be electrically connected to the pixel part 110. The gate driving circuit 120 may be implemented in a long-side region of the first non-display area NDA1 to be electrically connected to the pixel part 110. For example, the gate driving circuit 120 may be implemented in one or more of a pair of long-side regions of the first non-display area NDA to be electrically connected to a plurality of gate lines provided in the pixel part 110.

The gate driving circuit 120 according to an aspect of the present disclosure may be directly formed or implemented on the substrate 100 by a manufacturing process of a thin film transistor (TFT) of a pixel, based on a gate in panel (GIP) type. For example, the gate driving circuit 120 may be a gate embedded circuit or a gate shift register circuit, but aspects of the present disclosure are not limited thereto.

The gate driving circuit 120 according to an aspect of the present disclosure may include one or more of a first gate driving circuit 120A and a second gate driving circuit 120B.

The first gate driving circuit 120A may be implemented in a first long-side region of the first non-display area NDA adjacent to a first side (or one side) of the display area DA.

The second gate driving circuit 120B may be implemented in a second long-side region of the first non-display area NDA adjacent to a second side (or the other side), which is opposite to the first side (or the one side), of the display area DA.

According to an aspect of the present disclosure, the first gate driving circuit 120A may be electrically connected to one end of each of a plurality of gate lines, and the second gate driving circuit 120B may be electrically connected to the other end of each of a plurality of gate lines provided in the pixel part 110. According to another aspect of the present disclosure, the first gate driving circuit 120A may be electrically connected to one end of each of odd-numbered (or even-numbered) gate lines of the plurality of gate lines, and the second gate driving circuit 120B may be electrically connected to the other end of each of even-numbered (or odd-numbered) gate lines of the plurality of gate lines provided in the pixel part 110.

The pad part 130 may be implemented in the non-display area NDA of the substrate 100. The pad part 130 may be implemented in an end region of the second non-display area NDA2 of the non-display area NDA. For example, the pad part 130 may be implemented in an end region of the second non-display area NDA2. For example, the pad part 130 may be implemented in the fourth extension area EA4 of the second non-display area NDA2.

The pad part 130 may receive image data and a timing synchronization signal supplied from a display driving system (or a host driving circuit). The pad part 130 may be electrically connected to a flexible circuit film. The flexible circuit film may be attached on or electrically connected to the pad part 130 by a film attachment process using an anisotropic conductive film. The flexible circuit film may be electrically connected to the display driving system.

The pad part 130 may include a plurality of pads 131 which are disposed at a predetermined interval along the first direction X. The pad part 130 may include a power pad part, a display data pad part, a control signal pad part, a timing signal pad part, and a touch data pad part. For example, each of the power pad part, the display data pad part, the control signal pad part, the timing signal pad part, and the touch data pad part may be configured to include one or more of the plurality of pads 131.

The display driving circuit 140 may be mounted or disposed in the non-display area NDA of the substrate 100. The display driving circuit 140 may be disposed in the second non-display area NDA2 of the non-display area NDA. For example, the display driving circuit 140 may be mounted or disposed in the second extension region EA2 of the second non-display area NDA2. For example, the display driving circuit 140 may be mounted on the substrate 100 by a chip bonding process or a chip on film process.

The display driving circuit 140 may include a plurality of input channels (or bumps) and a plurality of output channels (or bumps).

Each of the plurality of input channels may be electrically connected to the pad part 130 through the plurality of pad connection lines CL. For example, the plurality of pad connection lines CL may be disposed in the third extension region EA3 of the substrate 100 between the display driving circuit 140 and the pad part 130 and may be individually (or a one-to-one relationship) connected (or coupled) between the plurality of input channels and the plurality of pads 131.

Each of the plurality of output channels may be electrically connected to the plurality of data lines Ld and the gate driving circuit 120 through the plurality of routing lines RL. For example, the plurality of routing lines RL may be disposed in the first non-display area NDA1 of the substrate 100 and the bending region BA and the first extension region EA1 of the second non-display area NDA2 of the substrate 100 and may be electrically connected between each of the plurality of data lines Ld and the gate driving circuit 120 and the plurality of output channels.

The display driving circuit 140 may generate and output a data signal and a gate control signal, based on the image data and the timing synchronization signal supplied through the pad part 130 from the display driving system. The data signal may be supplied to the data lines of the pixel part 110, and the gate control signal may be supplied to the gate driving circuit 120.

The gate control signal may include one or more gate start signals, a plurality of gate shift clocks, and a plurality of gate driving voltages. Therefore, in response to the gate control signal supplied from the display driving circuit 140, the gate driving circuit 120 may generate a gate signal (or a gate pulse) according to a predetermined order and may supply the gate signal to a corresponding gate line.

The display driving circuit 140 may generate and output various driving powers (or driving voltages) needed for displaying an image on the pixel part 110, based on an input power (or an input voltage) supplied through the pad part 130 from the display driving system.

The display driving circuit 140 may be configured to include various circuits needed for displaying an image on the pixel part 110. For example, the display driving circuit 140 may include various integrated circuits (ICs) and driving circuits such as a gate control signal generating circuit, a data signal generating circuit, a power generating circuit, and a clock generating circuit. For example, the display driving circuit 140 may be a driving IC or an integration driving IC, but aspects of the present disclosure are not limited thereto.

The display apparatus (or the display panel) 10 according to an aspect of the present disclosure may further include a test circuit part disposed under the display driving circuit 140.

The test circuit part may include a plurality of test TFTs electrically connected to the plurality of data lines disposed in the pixel part 110, one or more enable signal pads, and one or more test signal pads. In a test process performed before the display driving circuit 140 is mounted on the substrate 100, each of the plurality of test TFTs may be turned on by an enable signal applied through an enable signal pad and may supply a test signal, applied through a test signal pad, to each of the plurality of data lines.

The display apparatus (or the display panel) 10 according to an aspect of the present disclosure may further include an encapsulation part 150 which covers or surrounds the pixel part 110. The encapsulation part 150 may be configured to protect the pixel part 110. For example, the encapsulation part 150 may be configured to prevent external oxygen or water from penetrating into a display element of the pixel part 110.

The display apparatus (or the display panel) 10 according to an aspect of the present disclosure may further include a touch sensing part 160.

The touch sensing part 160 may be disposed or provided on the encapsulation part 150. For example, the touch sensing part 160 may be directly formed or provided at the encapsulation part 150. The touch sensing part 160 may include a touch sensor which senses a user touch. The touch sensing part 160 according to an aspect of the present disclosure may include a plurality of touch driving electrodes and a plurality of touch sensing electrodes for sensing a touch on the basis of a mutual capacitance type. The touch sensing part 160 according to another aspect of the present disclosure may include a plurality of touch electrodes (or touch sensing electrodes) for sensing a touch on the basis of a self-capacitance type.

The display apparatus (or the display panel) 10 according to an aspect of the present disclosure may include a functional film 170.

The functional film 170 according to an aspect of the present disclosure may be attached on the sensing part 160. The functional film 170 according to an aspect of the present disclosure may include a reflection preventing layer (or reflection preventing film) to prevent reflection of external light to improve contrast ratio and outdoor visibility for an image displayed on the display apparatus. For example, the reflection preventing layer may include a polarizing layer or a polarizing film. For example, the reflection preventing layer may include a circular polarizing layer (or circular polarizing film).

The display apparatus (or the display panel) 10 according to an aspect of the present disclosure may further include a cover layer 180 which covers the bending region BA of the substrate 100.

The cover layer (or a micro cover layer) 180 may be formed to cover the bending region BA of the substrate 100 and a peripheral region of the bending region BA. For example, the cover layer 180 may be coated on the bending region BA of the substrate 100 and the peripheral region of the bending region BA. The cover layer 180 may be formed to cover the routing lines disposed in the second non-display area NDA2 of the substrate 100 corresponding to a region between the display driving circuit 140 and the encapsulation part 150 on the substrate 100.

The cover layer 180 may include a polymer material. The cover layer 180 may protect routing lines, which are in the bending region BA, from an external impact and may prevent water from penetrating into the routing lines. For example, when the bending region BA of the substrate 100 is bent in a curved shape, the cover layer 180 may enable routing lines to be disposed on a neutral plane of the bending region BA. For example, when the bending region BA of the substrate 100 is bent in a curved shape, a neutral plane where a tensile force and a compressive force are 0 (zero) may be between the substrate 100 and the cover layer 180. Therefore, the cover layer 180 may include a material having an elastic modulus (or young's modulus) which is higher than that of substrate 100, so that the routing lines are disposed on the neutral plane of the bending region BA. Therefore, the routing lines in the bending region BA may be disposed on a neutral plane between the cover layer 180 and the substrate 100, and thus, when the bending region BA of the substrate 100 is bent in a curved shape, a bending stress of 0 (zero) may be applied to the routing lines, whereby the routing lines may be bent without being damaged by the bending stress.

The display apparatus (or the display panel) 10 according to an aspect of the present disclosure may further include a supporting member 200.

The supporting member 200 may be configured to support the other portion, except the bending region BA, of the substrate 100. The supporting member 200 may maintain the other portion, except the bending region BA, of the substrate 100 in a flat state.

The supporting member 200 according to an aspect of the present disclosure may include a first supporting plate 210, a second supporting plate 220, and a coupling member 230.

The first supporting plate 210 may be configured to support a rear surface (or a backside surface) of the substrate 100 overlapping with the display area DA. For example, the first supporting plate 210 may be coupled to or attached on the rear surface (or the backside surface) of the substrate 100 overlapping with the display area DA and the first non-display area NDA1. The first supporting plate 210 may maintain the display area DA and the first non-display area NDA1 in a flat state. For example, the first supporting plate 210 may be a first supporting film, a first back plate, or a first back film.

The second supporting plate 220 may be configured to support a rear surface (or a backside surface) of the substrate 100 overlapping with the extension region EA of the non-display area NDA. For example, the second supporting plate 220 may be coupled to or attached on the rear surface (or the backside surface) overlapping with the other extension region EA, except the bending region BA, of the second non-display area NDA2 of the non-display area NDA. The second supporting plate 220 may maintain the extension region EA of the non-display area NDA in a flat state. For example, the second supporting plate 220 may be a second supporting film, a second back plate, or a second back film.

The first and second supporting plates 210 and 220 may include a plastic material, but aspects of the present disclosure are not limited thereto.

The bending region BA of the substrate 100 may be disposed between the first supporting plate 210 and the second supporting plate 220. The bending region BA of the substrate 100 may not be supported by each of the first supporting plate 210 and the second supporting plate 220, and thus, may be freely bent. Therefore, the bending region BA of the substrate 100 may be bent to surround one lateral surface of the first supporting plate 210, and the extension region EA of the substrate 100 may be disposed on the rear surface (or the backside surface) of the substrate 100 overlapping with the display area DA of the substrate 100. Accordingly, the display apparatus according to an aspect of the present disclosure may decrease in bezel width which occurs due to the second non-display area NDA2 of the non-display area NDA, and thus, may have a thin bezel width.

The coupling member 230 may be connected or coupled between the first supporting plate 210 and the second supporting plate 220. The coupling member 230 may couple or fix the second supporting plate 220 to the rear surface (or the backside surface) of the first supporting plate 210, and thus, may bend the bending region BA of the substrate 100 at a certain curvature (or a curvature radius) and may maintain a bending state and a bending shape of the bending region BA of the substrate 100. For example, the coupling member 230 may be a bending maintenance member or a bending fixing member.

The coupling member 230 may be disposed between the first supporting plate 210 and the second supporting plate 220 overlapping with each other, with respect to a thickness direction Z of the substrate 100. The coupling member 230 may fix the second supporting plate 220, disposed on a rear surface of the first supporting plate 210, to a rear (or backside) edge portion of the first supporting plate 210, based on bending of the bending region BA of the substrate 100, and thus, may maintain a bending state and a bending shape of the bending region BA of the substrate 100.

A first surface (or a front surface) of the coupling member 230 may be attached on the rear (or backside) edge portion of the first supporting plate 210 adjacent the bending region BA of the substrate 100. A second surface (or a backside surface) of the coupling member 230 may be attached on a rear surface of the second supporting plate 220.

According to an aspect of the present disclosure, the coupling member 230 may include a mechanism or a double-sided tape including a metal material or a plastic material having a bar shape. The coupling member 230 according to another aspect of the present disclosure may include a bending guide portion which protrudes toward the bending region BA of the substrate 100. The bending guide portion may include a curved portion having a certain curvature (or a curvature radius). Accordingly, the bending region BA of the substrate 100 may be bent in a curved shape, based on bending guidance by the bending guide portion.

According to an aspect of the present disclosure, the first surface of the coupling member 230 may be attached on the rear periphery portion of the first supporting plate 210 by a first adhesive member 231. The second surface of the coupling member 230 may be attached on the rear surface of the second supporting plate 220 by a second adhesive member 232.

The supporting member 200 according to an aspect of the present disclosure may further include a supporting member 250.

The supporting member 250 may be coupled to or attached on the rear surface of the first supporting plate 210. For example, the supporting member 250 may be coupled to or attached on the rear surface of the first supporting plate 210 by an adhesive member 260.

The supporting member 250 according to an aspect of the present disclosure may be coupled to or attached on an entire rear surface of the first supporting plate 210. Accordingly, the coupling member 230 or the first surface of the coupling member 230 may be attached on a rear periphery portion of the supporting member 250 by the first adhesive member 231.

The supporting member 250 according to another aspect of the present disclosure may be coupled to or attached on the other region, except a region which overlap withs the coupling member 230 or is attached on the coupling member 230, of a rear region of the first supporting plate 210. For example, the supporting member 250 according to another aspect of the present disclosure may include a cutting portion which overlap withs the coupling member 230. The coupling member 230 or the first surface of the coupling member 230 may pass through the cutting portion of the supporting member 250 and may be attached on the rear periphery portion of the first supporting plate 210, and thus, the display apparatus may be slimmed by a thickness of the supporting member 250 and the adhesive member 260.

The supporting member 250 may include a metal material. For example, the supporting member 250 may include a metal layer. For example, the supporting member 250 may include a metal plate including a metal material which is good in thermal conductivity. The supporting member 250 may include a metal plate made of a metal material which is good in thermal conductivity. For example, the supporting member 250 may function as a noise prevention layer which prevents static electricity or frequency noise, occurring in the display driving system connected to the pad part 130, from penetrating into the pixel part 110. For example, the supporting member 250 may be a heat dissipation member, a heat dissipation plate, a shield member, a signal blocking member, a heat dissipation tape, a heat dissipation cushion tape, a conductive heat dissipation tape, a heat dissipation sheet, a heat dissipation ground sheet, or a conductive heat dissipation sheet.

The display apparatus (or the display panel) 10 according to an aspect of the present disclosure may be connected to or coupled to a rear surface of a cover member 300 by a connection member 30.

The cover member 300 may be implemented to cover an entire front surface of the display apparatus 10. For example, the cover member 300 may have a size which is greater than that of the display apparatus 10. For example, the cover member 300 may be attached on or coupled to the functional film 170 of the display apparatus 10 by the connection member 30. Accordingly, the cover member 300 may cover the functional film 170 of the display apparatus 10 and the bending region BA bent in a curved shape, and thus, may protect the display apparatus 10 from an external impact or may prevent an impact from being applied to the bending region BA bent in a curved shape.

The cover member 300 may be made of a transparent plastic material, a glass material, or a tempered glass material. The connection member 30 may be an adhesive layer or a tacky layer. For example, the connection member 30 may include a pressure sensitive adhesive (PSA), an optically clear adhesive (OCA), or an optically clear resin (OCR), but aspects of the present disclosure are limited thereto.

Figure 3:
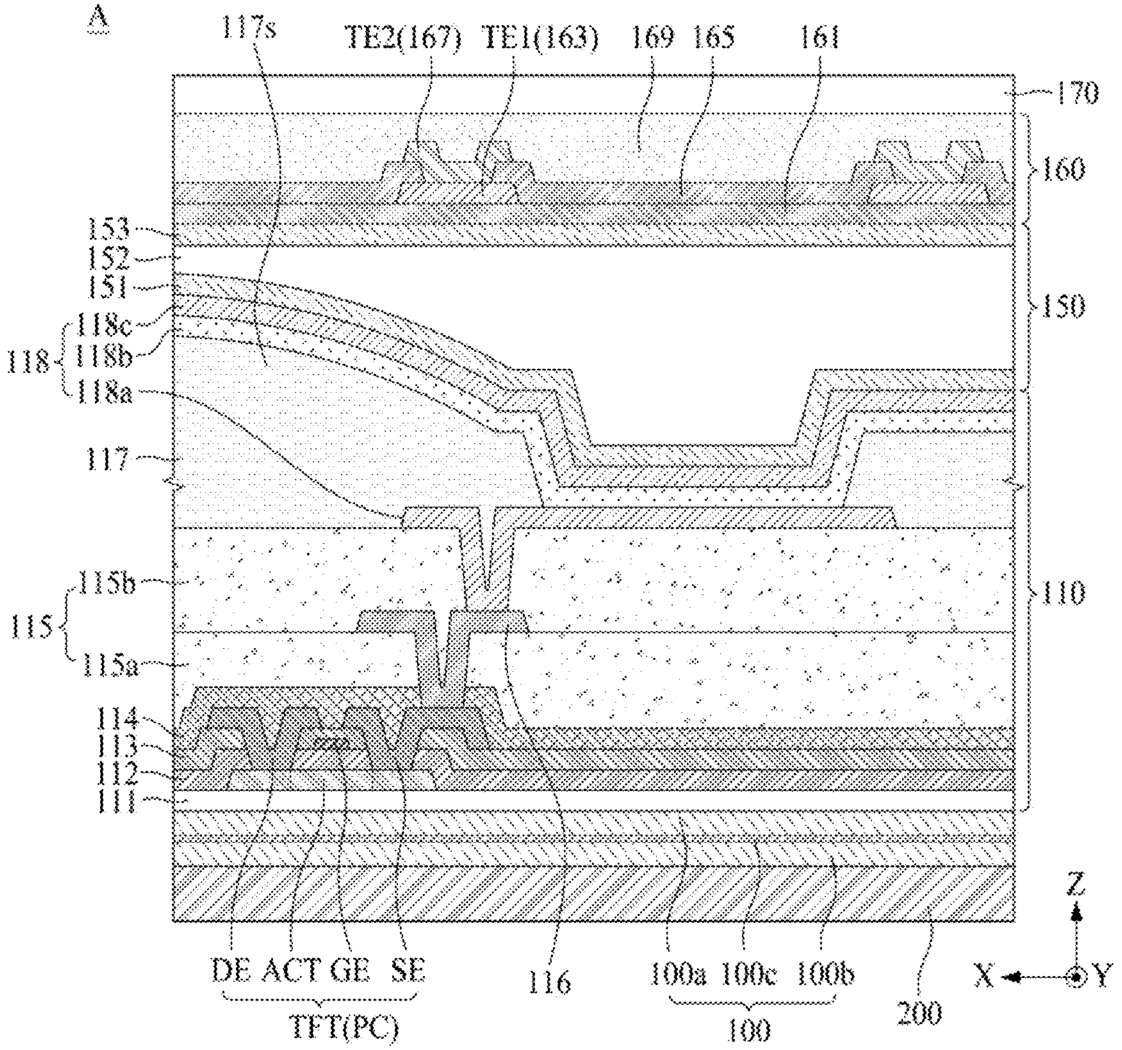
FIG. 3 is an enlarged view schematically illustrating region ‘A’ illustrated in FIG. 2.

FIG. 3 is an enlarged view schematically illustrating region 'A' illustrated in FIG. 2. FIG. 3 is a cross-sectional view schematically illustrating one subpixel illustrated in FIGS. 1 and 2.

Collectively with reference to FIGS. 1 to 3, the display apparatus 10 or the display panel according to an aspect of the present disclosure may include the substrate 100, the pixel part 110 and the encapsulation part 150.

The substrate 100 may include one or more plastic material layer. For example, the substrate 100 may include a first base substrate **100*a* and a second base substrate 100*b* stacked on the first base substrate 100*a*. Each of the first and second base substrates 100*a* and 100*b*** may include a plastic material such as polyimide and the like.

The substrate 100 may include a middle layer **100*c*** which is disposed or interposed between the first base substrate

100*a* and the second base substrate 100*b*. The middle layer 100*c* may be configured to prevent the penetration of water through the substrate 100. The middle layer 100*c* may be configured to electrically insulate the substrate 100. For example, the middle layer 100*c* may include an electrical insulating material. For example, the middle layer 100*c* may include an inorganic material.

The pixel part 110 may include a buffer layer 111, a pixel circuit PC, an overcoat layer 115, and a light emitting device layer 118.

The buffer layer 111 may be disposed on the substrate 100. The buffer layer 111 may prevent a material of the substrate 100 from being diffused to a transistor in performing a high temperature process in a manufacturing process of a TFT, or may prevent external water or moisture from penetrating into the light emitting device layer 118. Optionally, the buffer layer 111 may be omitted based on the kind and material of the substrate 100.

The pixel circuit PC may include a driving thin film transistor TFT which is provided at a pixel area on the substrate 100 or the buffer layer 111.

The driving thin film transistor TFT may include an active layer ACT, a gate electrode GE, a source electrode SE, and a drain electrode DE.

The active layer ACT may be disposed on the substrate 100 or the buffer layer 111. For example, the active layer ACT may include a semiconductor material based on metal oxide such as indium-gallium-zinc-oxide (IGZO), but is not limited thereto and may include a semiconductor material based on silicon such as amorphous silicon or polycrystalline silicon. For example, a semiconductor material may be deposited on the buffer layer 111, and the active layer ACT may be formed in a pattern shape by an annealing process for stabilization and a patterning process on the semiconductor material.

The active layer ACT may include a source region, a drain region, and a channel region between the source region and the drain region. The active layer ACT may be covered by a first insulation layer (or a gate insulation layer) 112.

The first insulation layer 112 may be formed in an island shape on only the channel region of the active layer ACT, or may be formed to cover an entire front surface of the buffer layer 111 or the substrate 100 including the active layer ACT. The first insulation layer 112 may be configured with a single layer of an inorganic material including nitride silicon (SiNx) or oxide silicon (SiOx), or a multilayer thereof.

The gate electrode GE may be disposed on the first insulation layer 112 to overlap with the channel region of the active layer ACT. The gate electrode GE may be formed of a gate metal material. For example, the gate electrode GE may include a single layer or a multilayer made of a single metal material including molybdenum (Mo), copper (Cu), titanium (Ti), aluminum (Al), chromium (Cr), gold (Au), nickel (Ni), or neodymium (Nd), or an alloy thereof. The gate electrode GE may be formed together with a gate line.

The gate electrode GE may be covered by the second insulation layer (or interlayer insulation layer) 113. The second insulation layer 113 may be formed on the first insulation layer 112 to cover the gate electrode GE. The second insulation layer 113 may be configured with a single layer of an inorganic material including nitride silicon (SiNx) or oxide silicon (SiOx), or a multilayer thereof, but is not limited thereto and may include an organic material.

The source electrode SE may be disposed on the second insulation layer 113 to be electrically connected to the source region of the active layer ACT. The source electrode SE may be electrically connected to the source region of the active layer ACT through a contact hole which is formed at the first insulation layer 112 and the second insulation layer 113 overlapping with the source region of the active layer ACT.

The drain electrode DE may be disposed on the second insulation layer 113 to be electrically connected to the drain region of the active layer ACT. The drain electrode DE may be electrically connected to the drain region of the active layer ACT through a contact hole which is formed at the first insulation layer 112 and the second insulation layer 113 overlapping with the drain region of the active layer ACT.

The source electrode SE and the drain electrode DE may be formed of a source/drain metal material. For example, the source electrode SE and the drain electrode DE may be configured with a conductive material which is the same as or different from that of the gate electrode GE. The source electrode SE and the drain electrode DE may be together with a data line.

The pixel circuit PC may further include at least one switching thin film transistor and at least one capacitor, which is disposed at the pixel area. The at least one switching thin film transistor and the at least one capacitor may be together with the driving thin film transistor TFT.

The driving thin film transistor TFT or the pixel circuit PC may be covered by a passivation layer 114. The passivation layer 114 may be configured with a single layer of an inorganic material including nitride silicon (SiNx) or oxide silicon (SiOx), or a multilayer thereof, but is not limited thereto and may include an organic material. The passivation layer 114 may be omitted.

The overcoat layer 115 may be disposed to cover the pixel circuit PC or the passivation layer 114. For example, the overcoat layer 115 may be implemented to planarize an upper portion of the passivation layer 114 or the pixel circuit PC and protect the pixel circuit PC. For example, the overcoat layer 115 may be configured with an organic material. For example, the overcoat layer 115 may be formed of an organic material including as acrylic resin, epoxy resin, phenol resin, polyamide resin, polyimide resin.

The overcoat layer 115 may include a first planarization layer 115*a* and a second planarization layer 115*b* formed on the first planarization layer 115*a*. The first planarization layer 115*a* and the second planarization layer 115*b* may have the same thickness, or may have different thicknesses.

The light emitting device layer 118 may include a first electrode 118*a*, a light emitting device 118*b*, and a second electrode 118*c*.

The first electrode 118*a* may be disposed in a pattern shape on the overcoat layer 115. The first electrode 118*a* may be disposed on the second planarization layer 115*b* of the overcoat layer 115. The first electrode 118*a* may be electrically connected to the source electrode SE of the driving thin film transistor TFT through an electrode contact hole formed at the overcoat layer 115.

The first electrode 118*a* may be an anode electrode (or a cathode electrode). For example, when the display apparatus 10 according to an aspect of the present disclosure has a top emission structure, the first electrode 118*a* may be a reflection electrode which reflects light incident from the light emitting device 118*b*. When the display apparatus 10 according to another aspect of the present disclosure has a bottom emission structure, the first electrode 118*a* may be a transparent electrode which transmits the light incident from the light emitting device 118*b*.

The light emitting device 118*b* may be disposed on the first electrode 118*a*.

The light emitting device 118*b* according to an aspect of the present disclosure may include one or more emission structure which are stacked on the first electrode 118*a* in the order or reverse order of a hole layer, a light emitting layer, and an electron layer. For example, the light emitting device 118*b* may be implemented to generate color light corresponding to a corresponding subpixel. For example, when a unit pixel includes red, green, and blue sub-pixels, a light emitting device 118*b* of a red subpixel may generate red light, a light emitting device 118*b* of a green subpixel may generate green light, and a light emitting device 118*b* of a blue subpixel may generate blue light.

The light emitting device 118*b* according to another aspect of the present disclosure may include a plurality of emission structures which are stacked on the first electrode 118*a* in the order or reverse order of a hole layer, a light emitting layer, and an electron layer. For example, the light emitting layer of each of the plurality of emission structures may generate one or more of blue light, green light, and red light or mixed light thereof. Light emitted from the light emitting device 118*b* may implement a color image by a color filter disposed to overlap with the light emitting device layer 118. The light emitting layer of each of the plurality of emission structures may generate one or more of blue light, green light, and red light or mixed light thereof, and thus, the light emitting device 118*b* may emit white light. The white light emitted from the light emitting device 118*b* may implement a color image by a color filter disposed to overlap with the light emitting device layer 118.

The second electrode 118*c* may be disposed on the light emitting device 118*b*. The second electrode 118*c* may be disposed on the light emitting device 118*b* to face the first electrode 118*a* with the light emitting device 118*b* therebetween.

The second electrode 118*c* may be a cathode electrode (or an anode electrode). For example, when the display apparatus 10 according to an aspect of the present disclosure has the top emission structure, the second electrode 118*c* may be a transparent electrode which transmits the light incident from the light emitting device 118*b*. When the display apparatus 10 according to another aspect of the present disclosure has the bottom emission structure, the second electrode 118*c* may be a reflection electrode which reflects the light incident from the light emitting device 118*b*.

The display apparatus 10 according to an aspect of the present disclosure may further include a bank 117.

The bank 117 may be disposed to define an opening portion (or an emission region) of a subpixel SP and cover a periphery portion of the first electrode 118*a*. For example, the bank 117 may be disposed on the overcoat layer 115 to cover only a periphery portion, except a center portion, of the first electrode 118*a*. For example, the bank 117 may include a mesh shape. For example, the bank 117 may include an organic material or an inorganic material, or may include a light absorbing material including a black pigment.

A bank projection 117*s* may be disposed on the bank 117. The bank projection 117*s* may protrude from the bank 117 and may be disposed on the bank 117 with a material different from that of the bank 117. For example, the bank projection 117*s* may be configured to support a mask for formation of the light emitting device 118*b*, but aspects of the present disclosure are not limited thereto. For example, the bank projection 117*s* may be a spacer.

The light emitting device 118*b* may be disposed in only an opening portion of each subpixel SP provided by the bank 117, or may be disposed on the bank 117 and the opening portion of each subpixel SP.

The display apparatus according to an aspect of the present disclosure may further include a connection electrode (or a middle electrode) 116 disposed in the overcoat layer 115, to prevent the occurrence of a pattern defect (or a contact defect) of the first electrode 118*a* caused by a distance between the first electrode 118*a* and the source electrode SE of the driving thin film transistor TFT.

The connection electrode 116 may be configured to be electrically connected to the source electrode SE of the driving thin film transistor TFT and the first electrode 118*a*. For example, the connection electrode 116 may be disposed on the first planarization layer 115*a* overlapping with the source electrode SE of the driving thin film transistor TFT and may be covered by the second planarization layer 115*b*. The connection electrode 116 may be connected to the source electrode SE of the driving thin film transistor TFT through the electrode contact hole provided at the first planarization layer 115*a*. The first electrode 118*a* may be electrically connected to the connection electrode 116 through the electrode contact hole provided at the second planarization layer 115*b*. Therefore, the first electrode 118*a* may be stably connected to the source electrode SE of the driving thin film transistor TFT through the connection electrode 116. The connection electrode 116 may include a conductive material which is the same as or different from that of the source electrode SE and the drain electrode DE of the driving thin film transistor TFT.

According to an aspect of the present disclosure, an additional auxiliary line (or an auxiliary signal line) for driving of the pixel circuit PC and/or emission of light from the light emitting device 118*b* may be disposed between the first planarization layer 115*a* and the second planarization layer 115*b*. For example, the auxiliary line (or the auxiliary signal line) may be formed of the same material in the same process as the connection electrode 116, but aspects of the present disclosure are not limited thereto.

The encapsulation part 150 may be configured to cover or surround the pixel part 110. For example, the encapsulation part 150 may be disposed on the light emitting device layer 118 and may cover or surround the light emitting device layer 118. The encapsulation part 150 may include at least one or more encapsulation layers. For example, the encapsulation part 150 may include one or more inorganic encapsulation layers and one or more organic encapsulation layers on the light emitting device layer 118. For example, the encapsulation part 150 may include a first encapsulation layer 151, a second encapsulation layer 152, and a third encapsulation layer 153.

The first encapsulation layer 151 may be disposed on the second electrode 118*c*. The second encapsulation layer 152 may be disposed on the second electrode 118*c* or the first encapsulation layer 151. The third encapsulation layer 153 may be disposed on the second electrode 118*c* or the second encapsulation layer 152. For example, the encapsulation part 150 may include the first encapsulation layer 151 on the second electrode 118*c*, the second encapsulation layer 152 on the first encapsulation layer 151, and the third encapsulation layer 153 on the second encapsulation layer 152.

The display apparatus 10 or the display panel according to an aspect of the present disclosure may further include a touch sensing part 160 disposed on the display area DA of the substrate 100.

The touch sensing part 160 may be disposed on the encapsulation part 150. For example, the touch sensing part 160 may be disposed on the third encapsulation layer 153 of the encapsulation part 150.

The touch sensing part 160 may include a touch buffer layer 161, a first touch electrode layer 163, a touch insulation layer 165, a second touch electrode layer 167, and a touch protection layer 169.

The touch buffer layer 161 may be disposed on the third encapsulation layer 153 of the encapsulation part 150. For example, the touch buffer layer 161 may be formed of an inorganic material including nitride silicon (SiNx) or oxide silicon (SiOx), but the aspects of the present disclosure are not limited thereto.

The first touch electrode layer 163 may include a plurality of first touch electrodes TE1 disposed on the touch buffer layer 161. The plurality of first touch electrodes TE1 may be made of transparent metal or opaque metal. For example, the plurality of first touch electrodes TE1 may include a plurality of bridge electrodes or a plurality of bridge lines, but the aspects of the present disclosure are not limited thereto.

The touch insulation layer 165 may be disposed on the touch buffer layer 161 to cover the first touch electrode layer 163. The touch insulation layer 165 may be formed of an inorganic material including nitride silicon (SiNx) or oxide silicon (SiOx), but the aspects of the present disclosure are not limited thereto.

The second touch electrode layer 167 may include a plurality of second touch electrodes TE2 disposed on the touch insulation layer 165. The plurality of second touch electrodes TE2 may be made of transparent metal or opaque metal. For example, each of the plurality of second touch electrodes TE2 may include a mesh structure. For example, the plurality of second touch electrodes TE2 may be a plurality of touch sensing electrodes or a plurality of touch driving electrodes, but the aspects of the present disclosure are not limited thereto.

In the second touch electrode layer 167, each of the plurality of second touch electrodes TE2 disposed adjacent to one another along a first direction X or a second direction Y may be connected to a corresponding first touch electrode TE1 of the plurality of first touch electrodes TE1 through a via hole provided at the touch insulation layer 165. Therefore, the plurality of second touch electrodes TE2 disposed adjacent to one another along the first direction X or the second direction Y may be connected to one another through the plurality of first touch electrodes TE1. For example, the plurality of second touch electrodes TE2 disposed adjacent to one another along the second direction Y may be connected to one another through the plurality of first touch electrodes TE1.

The touch protection layer 169 may be disposed on the touch insulation layer 165 to cover the second touch electrode layer 167. The touch protection layer 169 may be configured to planarize an upper portion of the touch sensing part 160 and protect the touch sensing part 160. For example, the touch protection layer 169 may be formed of an organic material, but the aspects of the present disclosure are not limited thereto.

The display apparatus 10 or the display panel according to an aspect of the present disclosure may further include a functional film 170 which is disposed on the touch sensing part 160.

The functional film 170 may include a reflection preventing layer (or reflection preventing film) which is attached on the touch sensing part 160. For example, the reflection preventing layer may include a circular polarizing layer (or circular polarizing film), but the aspects of the present disclosure are not limited thereto.

The display apparatus 10 or the display panel according to an aspect of the present disclosure may further include the supporting member 200 which is disposed at the rear surface of the substrate 100. The supporting member 200 may maintain the other portion, except the bending region BA, of the substrate 100 in a flat state. This may be the same as the supporting member 200 described above with reference to FIGS. 1 and 2, and thus, repeated descriptions thereof are omitted.

Figure 4:
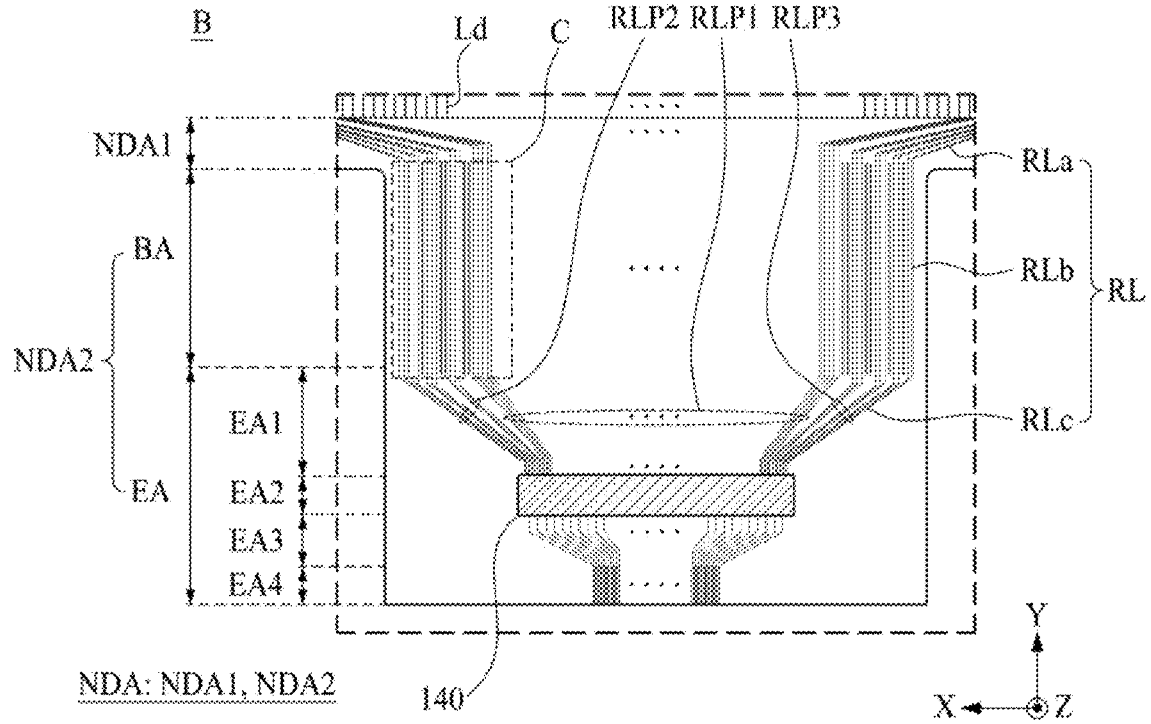
FIG. 4 is an enlarged view schematically illustrating region ‘B’ illustrated in FIG. 1.
Figure 5:
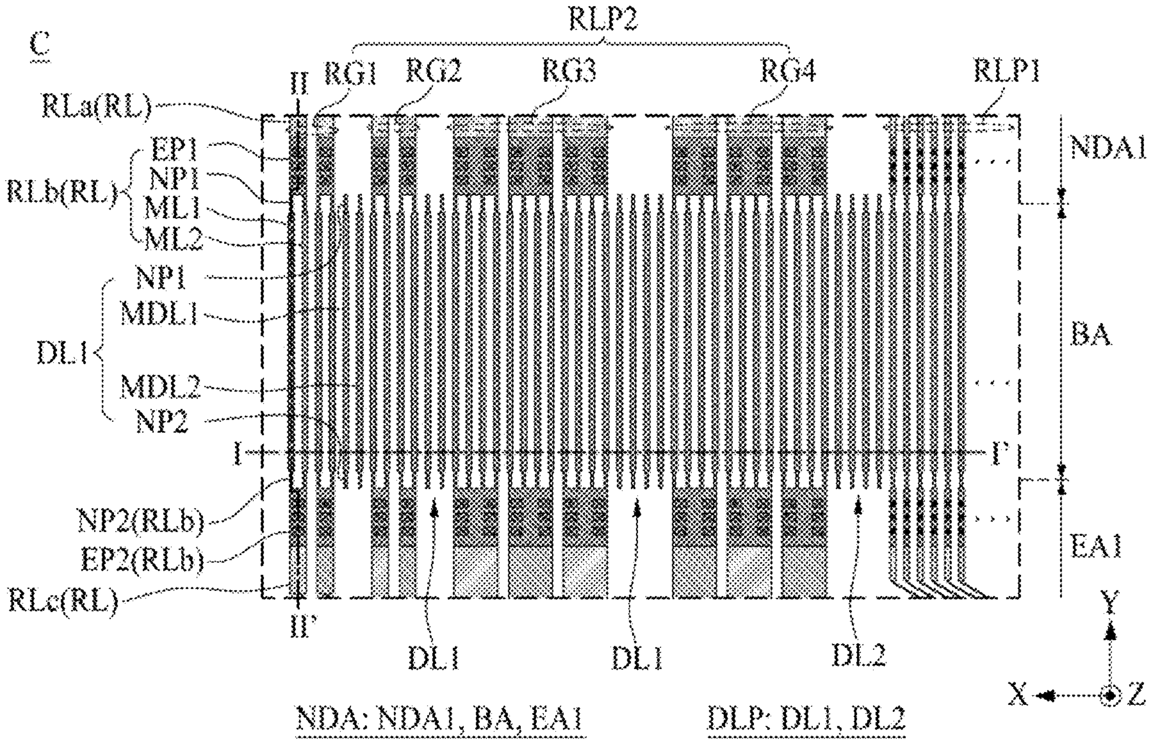
FIG. 5 is an enlarged view schematically illustrating region ‘C’ illustrated in FIG. 4.

FIG. 4 is an enlarged view schematically illustrating a region 13' illustrated in FIG. 1. FIG. 5 is an enlarged view schematically illustrating a region 'C' illustrated in FIG. 4. FIGS. 4 and 5 are diagrams for describing routing lines and dummy lines of the display apparatus 10 according to an aspect of the present disclosure.

With reference to FIGS. 1, 4, and 5, the display apparatus 10 according to an aspect of the present disclosure may further include a plurality of routing line portions RLP1, RLP2, and RLP3 for electrically connecting the display driving circuit 140 with each of the pixel part 110 and the gate driving circuit 120. For example, the display apparatus 10 according to an aspect of the present disclosure may further include first to third routing line portions RLP1, RLP2, and RLP3.

Each of the first to third routing line portions RLP1, RLP2, and RLP3 may be provided or disposed at a region, which is between the display driving circuit 140 and the display area DA, of the non-display area NDA of the substrate 100. For example, each of the first to third routing line portions RLP1, RLP2, and RLP3 may be disposed at the bending region BA, the first extension region EA1, and one region of the non-display area NDA of the substrate 100.

Each of the first to third routing line portions RLP1, RLP2, and RLP3 may include a plurality of routing lines RL. For example, the display apparatus 10 according to an aspect of the present disclosure may include a plurality of routing lines RL for electrically connecting the display driving circuit 140 with the pixel part 110 disposed in the display area DA of the substrate 100 and the gate driving circuit 120 disposed in the non-display area NDA of the substrate 100. The plurality of routing lines RL may be classified or grouped into a plurality of first routing lines disposed in the first routing line portion RLP1, a plurality of second routing lines disposed in the second routing line portion RLP2, and a plurality of third routing lines disposed in the third routing line portion RLP3.

The first routing line portion RLP1 may include the plurality of first routing lines which are electrically connected to the pixel part 110 disposed at the display area DA of the substrate 100 and are electrically connected to the display driving circuit 140. For example, the first routing line portion RLP1 may include the plurality of first routing lines which are disposed between the plurality of data lines Ld and the display driving circuit 140. A first end portion of each of the plurality of first routing lines may be electrically connected to an end portion of a corresponding data line of the plurality of data lines Ld in one region of the first non-display area NDA1. A second end portion of each of the plurality of first routing lines may be electrically connected to a corresponding data output channel of a plurality of data output channels among a plurality of output channels disposed at the display driving circuit 140 in the second extension region EA2 of the second non-display area NDA2.

Some of the plurality of first routing lines may be electrically connected to a plurality of second touch electrodes TE2 disposed in the touch sensing part 160, respectively. For example, the touch sensing part 160 may include a plurality of touch extension lines which extend from one side of each of the plurality of second touch electrodes TE2 to one region of the first non-display area NDA1. Each of the plurality of touch extension lines may be electrically connected to some of the plurality of first routing lines in the one region of the first non-display area NDA1. For example, the plurality of touch extension lines may be classified into a plurality of data routing lines and a plurality of touch routing lines. For example, the plurality of data routing lines may be disposed at a center portion of the first routing line portion RLP1, and the plurality of touch routing lines may be disposed at both edge portions of the first routing line portion RLP1.

The display driving circuit 140 may supply a data signal to each of the plurality of data lines Ld disposed in the display area DA of the substrate 100 through the plurality of data routing lines of the plurality of first routing lines. The display driving circuit 140 may supply a touch driving signal to each of the second touch electrodes of the touch sensing part 160, disposed in the display area DA of the substrate 100, through the plurality of touch routing lines of the plurality of first routing lines, or may sense a user touch through the second touch electrode TE2.

The second routing line portion RLP2 may include a plurality of second routing lines which are disposed adjacent to one side of the first routing line portion RLP1 and are disposed between the first gate driving circuit 120A of the gate driving circuit 120 and the display driving circuit 140. A first end portion of each of the plurality of second routing lines may be electrically connected to the first gate driving circuit 120A in one region of the first non-display area NDA1. A second end portion of each of the plurality of second routing lines may be electrically connected to a corresponding first gate output channel of a plurality of first gate output channels among a plurality of output channels disposed at the display driving circuit 140 in the second extension region EA2 of the second non-display area NDA2.

The plurality of second routing lines may be classified or grouped into a plurality of routing groups RG1 to RG4. The plurality of routing groups RG1 to RG4 may be spaced apart from one another to have a predetermined interval. Intervals between the plurality of routing groups RG1 to RG4 may be equal to or different from one another. For example, the second routing line portion RLP2 may include first to fourth routing groups RG1 to RG4 which are spaced apart from one another to have a predetermined interval. Intervals between the first to fourth routing groups RG1 to RG4 may be equal to or different from one another.

Each of the first to fourth routing groups RG1 to RG4 of the second routing line portion RLP2 may include one or more second routing lines.

One or more second routing lines included in the first routing group RG1 may be electrically connected to one or more gate start signal lines connected to the first gate driving circuit 120A. Accordingly, the first gate driving circuit 120A may start driving in response to one or more gate start signals supplied from the display driving circuit 140 through the one or more second routing lines included in the first routing group RG1.

The plurality of second routing lines included in the second routing group RG2 may be electrically connected to scan direction signal lines connected to the first gate driving circuit 120A, respectively. Accordingly, the first gate driving circuit 120A may be driven by a scan direction signal supplied from the display driving circuit 140 through the second routing line of the second routing group RG2.

The plurality of second routing lines included in the third routing group RG3 may be electrically connected to a plurality of shift clock lines connected to the first gate driving circuit 120A, respectively. Accordingly, the first gate driving circuit 120A may be driven by gate shift clocks supplied from the display driving circuit 140 through the plurality of second routing line included in the third routing group RG3.

The plurality of second routing lines included in the fourth routing group RG4 may be electrically connected to a plurality of gate driving voltage lines connected to the first gate driving circuit 120A, respectively. Accordingly, the first gate driving circuit 120A may be driven by the plurality of gate driving voltages supplied from the display driving circuit 140 through the plurality of second routing lines included in the fourth routing group RG4.

The third routing line portion RLP3 may include a plurality of third routing lines which are disposed adjacent to the other side of the first routing line portion RLP1 and are disposed between the display driving circuit 140 and the second gate driving circuit 120B of the gate driving circuit 120. A first end portion of each of the plurality of third routing line portion RLP3 may be electrically connected to the second gate driving circuit 120B in one region of the first non-display area NDA1. A second end portion of each of the plurality of third routing line portion RLP3 may be electrically connected to a corresponding second gate output channel of a plurality of second gate output channels among a plurality of output channels disposed at the display driving circuit 140 in the second extension region EA2 of the second non-display area NDA2. The plurality of third routing lines may be configured in a symmetrical (or horizontal symmetrical) structure with the plurality of second routing lines with respect to the first routing line portion RLP1.

The plurality of third routing lines may be classified or grouped into a plurality of routing groups. The plurality of routing groups may be spaced apart from one another to have a predetermined interval. Intervals between the plurality of routing groups may be equal to or different from one another. For example, the third routing line portion RLP3 may include first to fourth routing groups which are spaced apart from one another to have a predetermined interval. Intervals between the first to fourth routing groups may be equal to or different from one another.

Each of the first to fourth routing groups RG1 to RG4 of the third routing line portion RLP3 may include one or more third routing lines.

One or more third routing lines included in the first routing group of the third routing line portion RLP3 may be electrically connected to one or more gate start signal lines connected to the second gate driving circuit 120B. Accordingly, the second gate driving circuit 120B may start driving in response to one or more gate start signals supplied from the display driving circuit 140 through the one or more third routing lines included in the first routing group.

The plurality of third routing lines included in the second routing group of the third routing line portion RLP3 may be electrically connected to scan direction signal lines connected to the second gate driving circuit 120B, respectively. Accordingly, the second gate driving circuit 120B may be driven by a scan direction signal supplied from the display driving circuit 140 through the third routing line of the second routing group.

The plurality of third routing lines included in the third routing group of the third routing line portion RLP3 may be electrically connected to a plurality of shift clock lines connected to the second gate driving circuit 120B, respectively. Accordingly, the second gate driving circuit 120B may be driven by gate shift clocks supplied from the display driving circuit 140 through the plurality of third routing line included in the third routing group.

The plurality of third routing lines included in the fourth routing group of the third routing line portion RLP3 may be electrically connected to a plurality of gate driving voltage lines connected to the second gate driving circuit 120B, respectively. Accordingly, the second gate driving circuit 120B may be driven by the plurality of gate driving voltages supplied from the display driving circuit 140 through the plurality of third routing lines included in the fourth routing group.

The routing line RL included in each of the first to third routing line portions RLP1, RLP2, and RLP3 may include a first line portion RLa, a second line portion RLb, and a third line portion RLc.

The first line portion RLa may be disposed at one region of the first non-display area NDA1 of the substrate 100. For example, the first line portion RLa may be disposed to have a nonlinear shape on the substrate 100 between the bending region BA and the display area DA of the substrate 100. A first end portion (or a start portion) of the first line portion RLa may be electrically connected to a data line, a touch connection line, or the gate driving circuit 120. The first line portion RLa may include a nonlinear shape, a diagonal shape, or an oblique line. For example, the first line portion RLa may be a nonlinear portion, a nonlinear line portion, an oblique portion, an oblique line portion, a diagonal portion, or a diagonal line portion.

The first line portion RLa may be formed of a gate metal material. For example, the first line portion RLa may be formed of the same material in the same process as the gate electrode GE illustrated in FIG. 3, but aspects of the present disclosure are not limited thereto. For example, the first line portion RLa may be formed of a source/drain metal material. For example, the first line portion RLa may be formed of the same material in the same process as the source electrode SE (or the drain electrode DE) illustrated in FIG. 3. For example, when the first line portion RLa is disposed on the same layer as the gate electrode GE and is connected to a data line, an end portion of the data line may overlap with the first end portion of the first line portion RLa with an insulation layer therebetween and may be electrically connected to the first end portion of the first line portion RLa through a contact hole provided at the insulation layer, but aspects of the present disclosure are not limited thereto.

The second line portion RLb may be disposed on the bending region BA of the substrate 100. For example, the second line portion RLb may be disposed to have a linear shape on the bending region BA of the substrate 100. For example, the second line portion RLb may be a linear portion, a linear line portion, a rectilinear portion, a rectilinear line portion, a bending line portion, a link line portion, a straight line, or a bending routing line.

The second line portion RLb may include one or more micro-lines ML1 and ML2. For example, the second line portion RLb may include a plurality of micro-lines ML1 and ML2 parallel to each other and spaced apart from each other. When the second line portion RLb includes the plurality of micro-lines ML1 and ML2, the plurality of micro-lines ML1 and ML2 which are spaced apart from each other may be electrically connected to each other at both end portions of the second line portion RLb.

The second line portion RLb according to an aspect of the present disclosure may include one or more micro-lines ML1 and ML2, a first neck portion NP1, a second neck portion NP2, a first end portion EP1, and a second end portion EP2.

The one or more micro-lines ML1 and ML2 may be disposed at the bending region BA of the substrate 100 and may extend long in the second direction Y.

According to an aspect of the present disclosure, a second line portion RLb of each of a plurality of routing lines RL included in the first routing line portion RLP1 may include one or more micro-line ML, but aspects of the present disclosure are not limited thereto. A second line portion RLb of each of a plurality of routing lines RL included in each of the second and third routing line portions RLP2 and RLP3 may include two or more micro-lines ML1 and ML2, but aspects of the present disclosure are not limited thereto. For example, a second line portion RLb of each of a plurality of routing lines RL included in third and fourth routing groups RG3 and RG4 of first to fourth routing groups RG1 to RG4 of each of the second and third routing line portions RLP2 and RLP3 may include three or more micro-lines, but aspects of the present disclosure are not limited thereto. For example, a second line portion RLb of a routing line transferring a driving voltage among the plurality of routing lines RL may include three or more micro-lines.

The first neck portion NP1 may protrude or extend from one end of each of the one or more micro-lines ML1 and ML2. For example, the first neck portion NP1 may protrude or extend toward the first non-display area NDA1 via a boundary portion of the bending region BA and the first non-display area NDA1 from the micro-lines ML1 and ML2 inside the bending region BA. For example, at least a portion of the first neck portion NP1 may be disposed at the first non-display area NDA1. For example, the first neck portion NP1 may be a first protruding line or a first extension line.

The second neck portion NP2 may protrude or extend from the other end of each of the one or more micro-lines ML1 and ML2. For example, the second neck portion NP2 may protrude or extend toward the first extension region EA1 via a boundary portion of the bending region BA and the first extension region EA1 from the micro-lines ML1 and ML2 inside the bending region BA. For example, at least a portion of the second neck portion NP2 may be disposed at the first extension region EA1. For example, the second neck portion NP2 may be a second protruding line or a second extension line.

Each of the first neck portion NP1 and the second neck portion NP2 may have a line width which is relatively smaller than that of the micro-lines ML1 and ML2. Each of the first neck portion NP1 and the second neck portion NP2 may be a bending start portion of each of the micro-lines ML1 and ML2 and may be a boundary region between a flat portion and a curved portion of the substrate 100. Each of the first neck portion NP1 and the second neck portion NP2 may have a line width which is smaller than that of the micro-lines ML1 and ML2, and thus, when the bending region BA of the substrate 100 is bent in a curved shape, the bending region BA may be easily bent, whereby bending of the micro-lines ML1 and ML2 may be easily performed.

The first end portion EP1 may protrude or extend in common from the first neck portion NP1 of the one or more micro-lines ML1 and ML2. The first end portion EP1 may be disposed at the first non-display area NDA1 adjacent to the bending region BA and may be connected to the first neck portion NP1 protruding from the one or more micro-lines ML1 and ML2. The first end portion EP1 may be formed to have a line width which is greater than or equal to that of the one or more micro-lines ML1 and ML2. For example, when the second line portion RLb include two or more micro-lines ML1 and ML2, the first end portion EP1 may be connected to two or more first neck portions NP1 protruding from each of the two or more micro-lines ML1 and ML2 in common.

The first end portion (or a first connection portion) EP1 may be electrically connected to a second end portion (or an end portion) of the first line portion RLa in one region of the first non-display area NDA1 spaced apart from the bending region BA of the substrate 100. For example, for smooth bending of the bending region BA, the second end portion of the first line portion RLa and the first end portion EP1 of the second line portion RLb may not be disposed or provided inside the bending region BA and may be disposed outside the bending region BA or at the one region of the first non-display area NDA1 spaced apart from the bending region BA.

The second end portion EP2 may protrude or extend in common from the second neck portion NP2 of the one or more micro-lines ML1 and ML2. The second end portion EP2 may be disposed at the second non-display area NDA2 adjacent to the bending region BA and may be connected to the second neck portion NP2 protruding from the one or more micro-lines ML1 and ML2. The second end portion EP2 may be formed to have a line width which is greater than or equal to that of the one or more micro-lines ML1 and ML2. For example, when the second line portion RLb include two or more micro-lines ML1 and ML2, the second end portion EP2 may be connected to two or more second neck portions NP2 protruding from each of the two or more micro-lines ML1 and ML2 in common. The second end portion EP2 may have a symmetrical (or vertical symmetrical) structure with the first end portion EP1 with respect to the micro-lines ML1 and ML2.

The third line portion RLc may be disposed between the bending region BA of the substrate 100 and the display driving circuit 140. The third line portion RLc may be disposed between the bending region BA of the substrate 100 and the second extension region EA2. For example, the third line portion RLc may be disposed to have a nonlinear shape on the first extension region EA1 of the substrate 100. A first end portion (or a start portion) of the third line portion RLc may be electrically connected to the second end portion EP2 of the second line portion RLb. A second end portion (or an end portion) of the third line portion RLc may be electrically connected to the output channel of the display driving circuit 140. The third line portion RLc may include a nonlinear shape, an oblique line, or a diagonal shape. For example, the third line portion RLc may be a nonlinear portion, a nonlinear line portion, an oblique portion, an oblique line portion, a diagonal portion, or a diagonal line portion.

The first end portion of the third line portion RLc may be electrically connected to the second end portion EP2 of the second line portion RLb through a contact hole provided at an insulation layer overlapping with the second end portion of the second line portion RLb, but aspects of the present disclosure are not limited thereto.

The second end portion (or an end portion) EP2 of the second line portion RLb may be electrically connected to the first end portion (or the start portion) of the third line portion RLc in the first extension region EA1 spaced apart from the bending region BA of the substrate 100. For example, for smooth bending of the bending region BA, a connection portion (or a contact portion) between the second line portion RLb and the third line portion RLc may not be disposed or provided inside the bending region BA and may be disposed outside the bending region BA or at one region of the first extension region EA1 spaced apart from the bending region BA.

The third line portion RLc may be formed of a gate metal material or a source/drain metal material. For example, the third line portion RLc may be formed of the same material in the same process as the gate electrode GE and/or the source electrode SE (or the drain electrode DE) illustrated in FIG. 3.

According to an aspect of the present disclosure, third line portions RLc of two adjacent routing lines of the plurality of routing lines RL may include different metal materials or may be disposed on different layers, and thus, signal interference between adjacent routing lines may be minimized or prevented. For example, third line portions RLc of odd-numbered routing lines of the plurality of routing lines RL may be formed of the gate metal material, and third line portions RLc of even-numbered routing lines of the plurality of routing lines RL may be formed of the source/drain metal material, but aspects of the present disclosure are not limited thereto. For example, third line portions RLc of the odd-numbered routing lines may be formed of the source/drain metal material, and third line portions RLc of the even-numbered routing lines may be formed of the gate metal material. For example, the third line portions RLc of the even-numbered routing lines may be disposed between the third line portions RLc of the odd-numbered routing lines.

The display apparatus 10 or the display panel according to an aspect of the present disclosure may further include a dummy line portion DLP which is disposed at the bending region BA of the substrate 100.

The dummy line portion DLP may be configured so that a uniform bending stress is applied to an entire bending region BA of the substrate 100. For example, the dummy line portion DLP may be configured so that the bending region BA of the substrate 100 is bent in a curved shape or a uniform bending stress is applied to the entire bending region BA of the substrate 100 bent in a curved shape. For example, the dummy line portion DLP may be configured so that a bending stress does not concentrate at a portion of the second line portion RLb of each of the plurality of routing lines RL disposed at the bending region BA of the substrate 100 and the same or uniform bending stress is applied to the second line portion RLb of each of the plurality of routing lines RL.

The dummy line portion DLP may be configured so that all intervals (or line intervals) between the plurality of routing lines RL disposed at the bending region BA of the substrate 100 are equal to one another. For example, the dummy line portion DLP may be disposed between two adjacent routing lines having a relatively wide interval of line intervals between the plurality of routing lines RL, and thus, the plurality of routing lines RL disposed at the bending region BA of the substrate 100 may all have the same interval, based on the dummy line portion DLP. Accordingly, when the bending region BA of the substrate 100 is bent in a curved shape, a uniform bending stress may be applied to the entire bending region BA of the substrate 100, based on the dummy line portion DLP.

The dummy line portion DLP according to an aspect of the present disclosure may decrease a bending stress concentrating on routing lines arranged at a relatively narrow interval due to routing lines arranged at a relatively wide interval, and thus, may minimize or prevent the damage or disconnection of a routing line caused by the concentration of bending stress. In addition, the dummy line portion DLP may minimize or prevent over-etching of adjacent routing lines RL disposed in a relatively wide region among intervals between the plurality of routing lines RL, and thus, may minimize or prevent the line width non-uniformity of a routing line or a patterning defect of a routing line.

The dummy line portion DLP according to an aspect of the present disclosure may be disposed at the second routing line portion RLP2 in the bending region BA of the substrate 100. The dummy line portion DLP may be further disposed at the third routing line portion RLP3 in the bending region BA of the substrate 100. The dummy line portion DLP may be further disposed between the first routing line portion RLP1 and the second routing line portion RLP2 in the bending area BA of the substrate 100. The dummy line portion DLP may be further disposed between the first routing line portion RLP1 and the third routing line portion RLP3 in the bending area BA of the substrate 100. For example, the dummy line portion DLP may be disposed at one or more of the second routing line portion RLP2, the third routing line portion RLP3, a region between the first routing line portion RLP1 and the second routing line portion RLP2, and a region between the first routing line portion RLP1 and the third routing line portion RLP3.

The dummy line portion DLP according to an aspect of the present disclosure may include one or more first dummy lines DL1 disposed at one or more of the second routing line portion RLP2 and the third routing line portion RLP3. The one or more first dummy lines DL1 may be disposed between first to fourth routing groups RG1 to RG4 of the second routing line portion RLP2. The one or more first dummy lines DL1 disposed at the second routing line portion RLP2 may be disposed at one or more of a region between a first routing group RG1 and a second routing group RG2, a region between the second routing group RG2 and a third routing group RG3, and a region between the third routing group RG3 and a fourth routing group RG4.

The one or more first dummy lines DL1 according to an aspect of the present disclosure may include one or more micro dummy lines MDL1 and MDL2 disposed inside the bending region BA of the substrate 100.

The one or more micro dummy lines MDL1 and MDL2 may be disposed at the bending region BA of the substrate 100 and may extend long in the second direction Y.

According to an aspect of the present disclosure, the one or more micro dummy lines MDL1 and MDL2 may be disposed between the first routing group RG1 and the second routing group RG2. Intervals between one or more micro dummy lines MDL1 and MDL2 and adjacent routing line RL may be equal to one another. For example, when a plurality of micro dummy lines MDL1 and MDL2 are disposed between the first routing group RG1 and the second routing group RG2, an interval between the plurality of micro dummy lines MDL1 and MDL2 may be the same as an interval between the plurality of routing lines RL. Likewise, the one or more micro dummy lines MDL1 and MDL2 may be disposed between the second routing group RG2 and the third routing group RG3. The one or more micro dummy lines MDL1 and MDL2 may be disposed between the third routing group RG3 and the fourth routing group RG4. Accordingly, the one or more micro dummy lines MDL1 and MDL2 may be disposed at a region which is relatively wider than an interval between a plurality of routing lines RL in the second routing line portion RLP2, and thus, all intervals between the one or more micro dummy lines MDL1 and MDL2 and a plurality of second routing lines disposed at the second routing line portion RLP2 of the bending region BA of the substrate 100 may be equal to one another.

Therefore, when the bending region BA of the substrate 100 is bent in a curved shape, a bending stress may be uniformly applied to the second line portion RLb of each of a plurality of routing lines disposed at the bending region BA, and thus, a crack or disconnection of a routing line occurring due to the concentration of bending stress caused by an interval deviation between a plurality of routing lines may be minimized or prevented. In addition, the one or more micro dummy lines MDL1 and MDL2 may minimize or prevent over-etching of adjacent routing lines RL arranged in a relatively wide region among intervals between the plurality of routing lines RL, and thus, may minimize or prevent the line width non-uniformity of a routing line or a patterning defect of a routing line.

The one or more first dummy lines DL1 according to an aspect of the present disclosure may further include a first neck portion NP1 and a second neck portion NP2.

The first neck portion NP1 may protrude or extend from one end of each of the one or more micro dummy lines MDL1 and MDL2. For example, the first neck portion NP1 may protrude or extend toward the first non-display area NDA1 via a boundary portion of the bending region BA and the first non-display area NDA1 from the one or more micro dummy lines MDL1 and MDL2 inside the bending region BA. For example, at least a portion of the first neck portion NP1 may be disposed at the first non-display area NDA1.

The second neck portion NP2 may protrude or extend from the other end of each of the one or more micro dummy lines MDL1 and MDL2. For example, the second neck portion NP2 may protrude or extend toward the first extension region EA1 via a boundary portion of the bending region BA and the first extension region EA1 from the one or more micro dummy lines MDL1 and MDL2 inside the bending region BA. For example, at least a portion of the second neck portion NP2 may be disposed at the first extension region EA1.

Each of the first neck portion NP1 and the second neck portion NP2 may have a line width which is relatively smaller than that of the one or more micro dummy lines MDL1 and MDL2. Each of the first neck portion NP1 and the second neck portion NP2 may be a bending start portion of each of the one or more micro dummy lines MDL1 and MDL2 and may be a boundary region between a flat portion and a curved portion of the substrate 100. Each of the first neck portion NP1 and the second neck portion NP2 may have a line width which is smaller than that of the one or more micro dummy lines MDL1 and MDL2, and thus, when the bending region BA of the substrate 100 is bent in a curved shape, the bending region BA may be easily bent, whereby bending of the one or more micro dummy lines MDL1 and MDL2 may be easily performed.

The one or more first dummy lines DL1 according to an aspect of the present disclosure may be implemented to have an island-shaped pattern at the bending region BA of the substrate 100, and thus, may be maintained in an electrical floating state, but aspects of the present disclosure are not limited thereto.

The one or more first dummy lines DL1 according to another aspect of the present disclosure may be configured to electrically maintain a ground voltage. For example, the one or more first dummy lines DL1 may be supplied with the ground voltage from the display driving circuit 140. For example, the one or more first dummy lines DL1 may extend to be electrically connected to a ground channel of the display driving circuit 140. Accordingly, the one or more first dummy lines DL1 maintaining the ground voltage may decrease signal interference between adjacent routing lines and may discharge static electricity flowing into the bending region BA from the outside.

The dummy line portion DLP according to an aspect of the present disclosure may further include one or more second dummy lines DL2 disposed between the first routing line portion RLP1 and the second routing line portion RLP2. The dummy line portion DLP according to an aspect of the present disclosure may further include one or more second dummy lines DL2 disposed at a region between the first routing line portion RLP1 and the second routing line portion RLP2 and a region between the first routing line portion RLP1 and the third routing line portion RLP3.

The one or more second dummy lines DL2 according to an aspect of the present disclosure may include one or more micro dummy lines MDL1 and MDL2 disposed inside the bending region BA of the substrate 100. Except for that the one or more micro dummy lines MDL1 and MDL2 are disposed the region between the first routing line portion RLP1 and the second routing line portion RLP2 and/or the region between the first routing line portion RLP1 and the third routing line portion RLP3, the one or more micro dummy lines MDL1 and MDL2 may be substantially the same as the one or more micro dummy lines MDL1 and MDL2 configuring the one or more first dummy lines DL1, and thus, repeated descriptions thereof are omitted.

According to an aspect of the present disclosure, all intervals between the plurality of routing lines RL, one or more first dummy lines DL1, and one or more second dummy lines DL2 disposed at the bending region BA of the substrate 100 may be equal to one another. Therefore, when the bending region BA of the substrate 100 is bent in a curved shape, a bending stress may be uniformly applied to the second line portion RLb of each of a plurality of routing lines disposed at the bending region BA, and thus, a crack or disconnection of a routing line occurring due to the concentration of bending stress caused by an interval deviation between a plurality of routing lines may be minimized or prevented.

The one or more second dummy lines DL2 according to an aspect of the present disclosure may further include one or more micro dummy lines MDL1 and MDL2, a first neck portion NP1, and a second neck portion NP2 like the one or more first dummy lines DL1, and thus, repeated descriptions thereof are omitted.

The one or more second dummy lines DL2 according to an aspect of the present disclosure may be implemented to have an island-shaped pattern at the bending region BA of the substrate 100, and thus, may be maintained in an electrical floating state, but aspects of the present disclosure are not limited thereto. The one or more second dummy lines DL2 according to another aspect of the present disclosure may be configured to electrically maintain a ground voltage. For example, the one or more second dummy lines DL2 may be supplied with the ground voltage from the display driving circuit 140. For example, the one or more second dummy lines DL2 may extend to be electrically connected to a ground channel of the display driving circuit 140. Accordingly, the one or more second dummy lines DL2 maintaining the ground voltage may decrease signal interference between adjacent routing lines and may discharge static electricity flowing into the bending region BA from the outside.

Figure 6:
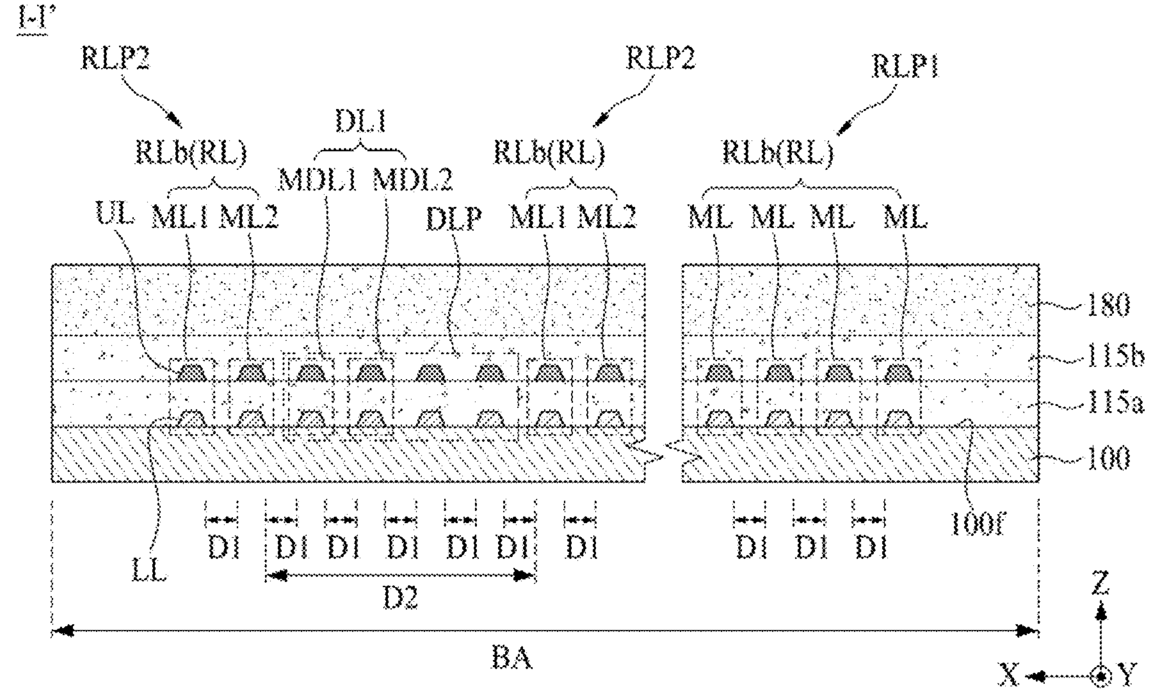
FIG. 6 is a cross-sectional view taken along line I-I' illustrated in FIG. 5.

FIG. 6 is a cross-sectional view taken along line I-I' illustrated in FIG. 5. FIG. 6 is a diagram illustrating a structure of a micro-line and a micro dummy line according to an aspect of the present disclosure.

With reference to FIGS. 3, 5, and 6, in the display apparatus or the display panel according to an aspect of the present disclosure, micro-lines ML of each of second line portions RLb of routing lines RL included in a first routing line portion RLP1 may be disposed in parallel to have a first interval D1 along the first direction X.

Each of the micro-lines ML of the first routing line portion RLP1 disposed at the bending region BA of the substrate 100 may include a first metal line LL and a second metal line UL.

The first metal line (or a lower metal line) LL may be disposed on the bending region BA of the substrate 100. The first metal line LL may directly contact a front surface (or an upper surface) 100*f* of the substrate 100. For example, each of the buffer layer 111, the first insulation layer 112, and the second insulation layer 113, which is disposed at the bending region BA of the substrate 100 and formed of an inorganic material, may be removed before a process of forming the first metal line LL. For example, the inorganic material layers 111 to 113 disposed at the bending region BA of the substrate 100 may be vulnerable to a bending stress, and thus, may be easily damaged by the bending stress and the routing lines may be damaged due to the damage of the inorganic material layers 111 to 113. Accordingly, the first metal line LL may be formed at the bending region BA of the substrate 100 from which the inorganic material layers 111 to 113 have been removed, and thus, the first metal line LL may directly contact the front surface 100*f* of the substrate 100.

The first metal line LL may be formed of a gate metal material or a source/drain metal material. For example, the first metal line LL may be formed of the same material in the same process as a source electrode SE (or a drain electrode DE) illustrated in FIG. 3.

The first metal line LL may be covered or surrounded by the first planarization layer 115*a*. In the bending region BA of the substrate 100, when the passivation layer 114 is formed to cover the first metal line LL formed of an inorganic material, the passivation layer 114 formed at the bending region BA of the substrate 100 may be removed from the bending region BA of the substrate 100 before a process of forming the first planarization layer 115*a*. Therefore, the first metal line LL may be covered or surrounded by the first planarization layer 115*a* made of an organic material. The first planarization layer 115*a* may provide a flat surface at the bending region BA of the substrate 100 where the first metal line LL is disposed and may protect the first metal line LL.

The second metal line (or an upper metal line) UL may be disposed on the first planarization layer 115*a* to overlap with the first metal line LL. The second metal line UL may have the same line width as that of the first metal line LL. The second metal line UL may be formed to accurately overlap with the first metal line LL without being staggered with the first metal line LL. When a crack or a disconnection occurs in the first metal line LL, the second metal line UL may be an auxiliary line or a redundancy line for replacing a function of the first metal line LL, but aspects of the present disclosure are not limited thereto. For example, the first metal line LL may be an auxiliary line or a redundancy line for replacing a function of the second metal line UL.

The second metal line UL may be formed of a source/drain metal material or a metal material of a connection electrode 116. For example, the second metal line UL may be formed of the same material in the same process as the connection electrode 116.

The second metal line UL may be covered or surrounded by the second planarization layer 115*b*. The second planarization layer 115*b* may provide a flat surface at the bending region BA of the substrate 100 where the second metal line UL is disposed and may protect the second metal line UL. The second planarization layer 115*b* may be covered by a cover layer 180.

In the display apparatus or the display panel according to an aspect of the present disclosure, in a second line portion RLb of each of a plurality of routing lines RL included in each of second and third routing line portions RLP2 and RLP3, two or more micro-lines ML1 and ML2 may be disposed in parallel to have the first interval D1 along the first direction X.

Each of the two or more micro-lines ML1 and ML2 may include the first metal line LL and the second metal line UL. Each of a first metal line LL and a second metal line UL of the two or more micro-lines ML1 and ML2 may be formed of the same material in the same process as each of the first metal line LL and the second metal line UL of one micro-line ML, and thus, repeated descriptions thereof are omitted.

In the display apparatus or the display panel according to an aspect of the present disclosure, a dummy line portion DLP may be disposed at a region between routing lines having a second interval D2 which is greater than the first interval D1, in the second routing line portion RLP2. In addition, the dummy line portion DLP may be disposed at a region between the first routing line portion RLP1 and the second routing line portion RLP2 having an interval which is greater than the first interval D1. In addition, the dummy line portion DLP may be disposed at a region between the first routing line portion RLP1 and the third routing line portion RLP3 having an interval which is greater than the first interval D1.

The dummy line portion DLP may include one or more micro dummy lines MDL which are disposed in parallel to have the first interval D1 along the first direction X. An interval between the micro dummy line MDL and a routing line adjacent thereto may be the same as the first interval D1.

Each of the micro dummy line MDL may include a first metal line LL and a second metal line UL. Each of the first metal line LL and the second metal line UL of the micro dummy line MDL may be formed of the same material in the same process as each of the first metal line LL and the second metal line UL of one micro-line ML, and thus, repeated descriptions thereof are omitted.

Figure 7:
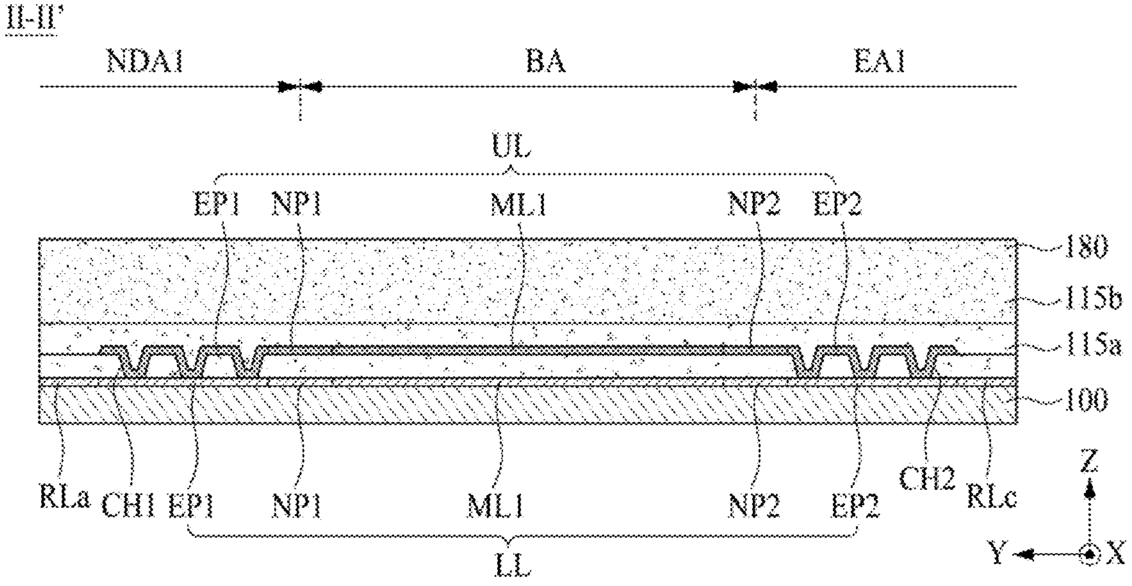
FIG. 7 is a cross-sectional view taken along line II-II' illustrated in FIG. 5.

FIG. 7 is a cross-sectional view taken along line II-II' illustrated in FIG. 5. FIG. 7 is a diagram for describing a connection structure between the first and second metal lines of the second line portion illustrated in FIG. 6.

With reference to FIGS. 5 to 7, a second line portion RLb according to an aspect of the present disclosure may include a first metal line LL and a second metal line UL.

The first metal line LL may directly contact a front surface (or an upper surface) 100*f* of the substrate 100. The first metal line LL may include a micro-line ML1, a first neck portion NP1, a second neck portion NP2, a first end portion EP1, and a second end portion EP2. Such elements may be as described above with reference to FIG. 5, and thus, repeated descriptions thereof are omitted.

The first end portion EP1 of the first metal line LL may be connected to the first line portion RLa, or may extend from the first line portion RLa. The second end portion EP2 of the first metal line LL may be connected to the third line portion RLc, or may extend from the third line portion RLc.

The second metal line UL may be disposed on the first planarization layer 115*a* covering the first metal line LL and may overlap with the first metal line LL.

The second metal line UL may include a micro-line ML1, a first neck portion NP1, a second neck portion NP2, a first end portion EP1, and a second end portion EP2. Such elements may be as described above with reference to FIG. 5, and thus, repeated descriptions thereof are omitted. The micro-line ML1, the first neck portion NP1, the second neck portion NP2, the first end portion EP1, and the second end portion EP2 of the second metal line UL may respectively overlap with the micro-line ML1, the first neck portion NP1, the second neck portion NP2, the first end portion EP1, and the second end portion EP2 of the first metal line LL.

The first end portion EP1 of the second metal line UL may be electrically connected to the first end portion EP1 of the first metal line LL through one or more first contact holes CH1 provided at the first planarization layer (or the insulation layer) 115*a* overlapping with the first end portion EP1 of the first metal line LL. Accordingly, the second metal line UL and the first metal line LL may be electrically connected to each other and may be connected to the first line portion RLa in common.

The second end portion EP2 of the second metal line UL may be electrically connected to the second end portion EP2 of the first metal line LL through one or more second contact holes CH2 provided at the first planarization layer (or the insulation layer) 115*a* overlapping with the second end portion EP2 of the first metal line LL. Accordingly, the second metal line UL and the first metal line LL may be electrically connected to each other and may be connected to the third line portion RLc in common.

A third line portion RLc of odd-numbered (or even-numbered) routing lines of a plurality of routing lines RL may be electrically connected to the first metal line LL of the second line portion RLb. For example, the third line portion RLc of the odd-numbered (or even-numbered) routing lines may be formed of the same material in the same process as the first metal line LL of the second line portion RLb, but aspects of the present disclosure are not limited thereto.

A third line portion RLc of even-numbered (or odd-numbered) routing lines of the plurality of routing lines RL may be electrically connected to the second metal line UL of the second line portion RLb. For example, the third line portion RLc of the even-numbered (or odd-numbered) routing lines may be formed of the same material in the same process as the second metal line UL of the second line portion RLb, but aspects of the present disclosure are not limited thereto.

Figure 8:
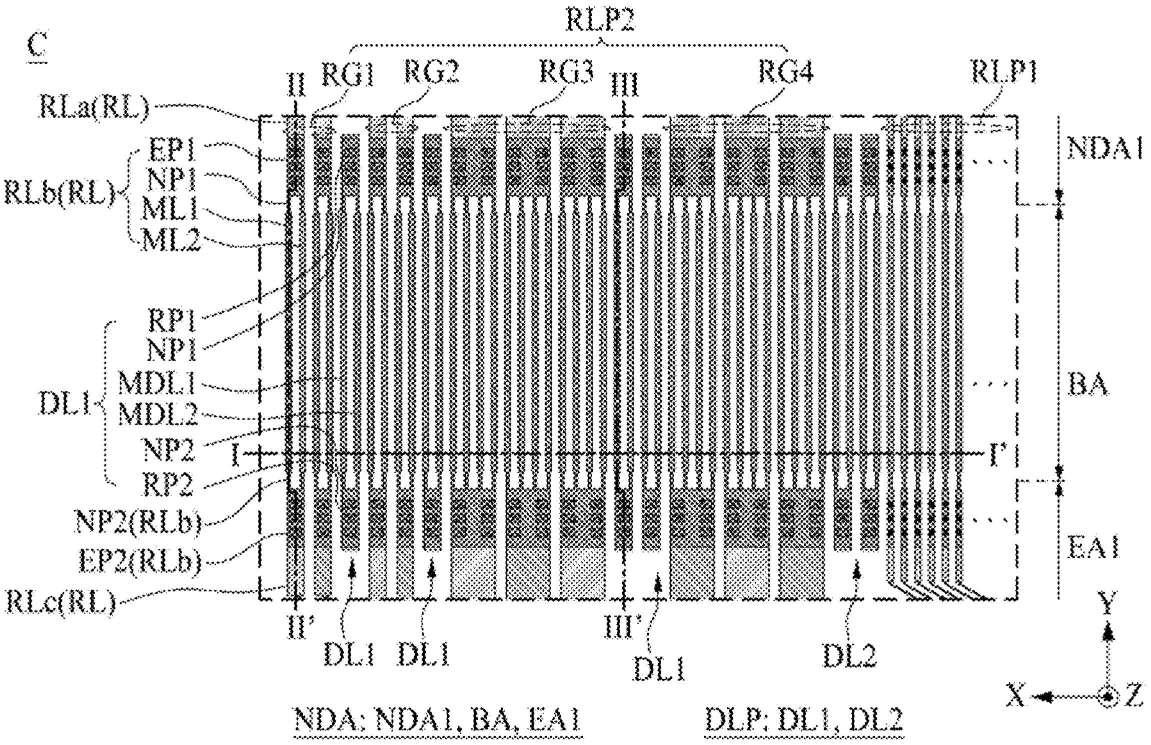
FIG. 8 is another enlarged view schematically illustrating region ‘C’ illustrated in FIG. 4.
Figure 9:
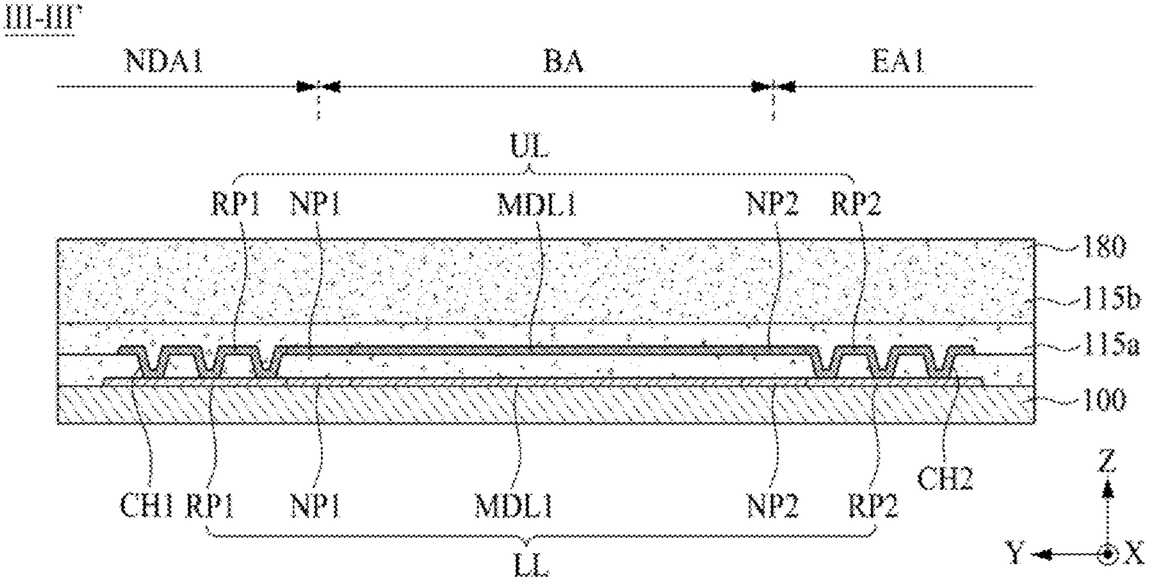
FIG. 9 is a cross-sectional view taken along line III-III' illustrated in FIG. 8.

FIG. 8 is another enlarged view schematically illustrating a region 'C' illustrated in FIG. 4. FIG. 9 is a cross-sectional view taken along line III-III' illustrated in FIG. 8. FIGS. 8 and 9 illustrate an aspect implemented by modifying a dummy line portion in the display apparatus described above with reference to FIGS. 1 to 7. In the following description, therefore, repeated descriptions of the other elements except a dummy line portion and relevant elements are omitted or will be briefly given. A cross-sectional view taken along line I-I' illustrated in FIG. 8 is illustrated in FIG. 6, and a cross-sectional view taken along line II-II' illustrated in FIG. 8 is illustrated in FIG. 7.

With reference to FIGS. 8 and 9, in a dummy line portion DLP according to an aspect of the present disclosure, each of one or more first dummy lines DL1 and one or more second dummy lines DL2 may include one or more micro dummy lines MDL1 and MDL2, a first neck portion NP1, a second neck portion NP2, a first reinforcement portion RP1, and a second reinforcement portion RP2.

Each of the one or more micro dummy lines MDL1 and MDL2, the first neck portion NP1, and the second neck portion NP2 may be as described above with reference to FIGS. 5 and 6, and thus, repeated descriptions thereof are omitted. Also, the descriptions of FIGS. 5 and 6 may be included in the descriptions of FIGS. 8 and 9.

The first reinforcement portion RP1 may be disposed at the first non-display area NDA1 adjacent to the bending region BA and may be connected to the first neck portion NP1 protruding from the one or more micro dummy lines MDL1 and MDL2. The first reinforcement portion RP1 may be formed to have a line width which is greater than or equal to that of the one or more micro dummy lines MDL1 and MDL2. For example, when the first dummy line DL1 includes two or more micro dummy lines MDL1 and MDL2, the first reinforcement portion RP1 may be connected to two or more first neck portions NP1 respectively protruding from the two or more micro dummy lines MDL1 and MDL2 in common.

The first reinforcement portion RP1 may be disposed at one region of the first non-display area NDA1 spaced apart from the bending region BA of the substrate 100. For example, the first reinforcement portion RP1 may fix or grasp the first end portions of one or more micro dummy lines MDL1 and MDL2 in the one region of the first non-display area NDA1, and thus, when the bending region BA is bent, the partial detachment (or a layer-lifting phenomenon) of the one or more micro dummy lines MDL1 and MDL2 may be minimized or prevented.

The second reinforcement portion RP2 may be disposed at the second non-display area NDA2 adjacent to the bending region BA and may be connected to the second neck portion NP2 protruding from the one or more micro dummy lines MDL1 and MDL2. The second reinforcement portion RP2 may be formed to have a line width which is greater than or equal to that of the one or more micro dummy lines MDL1 and MDL2. For example, when the first dummy line DL1 includes two or more micro dummy lines MDL1 and MDL2, the second reinforcement portion RP2 may be connected to two or more second neck portions NP2 respectively protruding from the two or more micro dummy lines MDL1 and MDL2 in common. The second reinforcement portion RP2 may have a symmetrical (or vertical symmetrical) structure with the first reinforcement portion RP1 with respect to the one or more micro dummy lines MDL1 and MDL2.

The second reinforcement portion RP2 may be disposed at a first extension region EA1 spaced apart from the bending region BA of the substrate 100. For example, the second reinforcement portion RP2 may fix or grasp the second end portions of one or more micro dummy lines MDL1 and MDL2 in the first extension region EA1, and thus, when the bending region BA is bent, the partial detachment (or a layer-lifting phenomenon) of the one or more micro dummy lines MDL1 and MDL2 may be minimized or prevented.

According to an aspect of the present disclosure, each of the one or more first dummy lines DL1 and the one or more second dummy lines DL2 may include a first metal line LL and a second metal line UL.

The first metal line LL may directly contact a front surface (or an upper surface) 100*f* of the substrate 100. The first metal line LL may be implemented to have an island-shaped pattern in the bending region BA of the substrate 100. The first metal line LL may include micro dummy lines MDL1 and MDL2, a first neck portion NP1, a second neck portion NP2, a first reinforcement portion RP1, and a second reinforcement portion RP2. Such elements may be as described above, and thus, repeated descriptions thereof are omitted.

The second metal line UL may be disposed on the first planarization layer 115*a* covering the first metal line LL and may overlap with the first metal line LL.

The second metal line UL may include micro dummy lines MDL1 and MDL2, a first neck portion NP1, a second neck portion NP2, a first reinforcement portion RP1, and a second reinforcement portion RP2. Such elements may be as described above, and thus, repeated descriptions thereof are omitted. The micro dummy lines MDL1 and MDL2, the first neck portion NP1, the second neck portion NP2, the first reinforcement portion RP1, and the second reinforcement portion RP2 of the second metal line UL may respectively overlap with the micro dummy lines MDL1 and MDL2, the first neck portion NP1, the second neck portion NP2, the first reinforcement portion RP1, and the second reinforcement portion RP2 of the first metal line LL.

The first end portion EP1 of the second metal line UL may be electrically connected to the first end portion EP1 of the first metal line LL through one or more first contact holes CH1 provided at the first planarization layer 115*a* overlapping with the first end portion EP1 of the first metal line LL.

The second end portion EP2 of the second metal line UL may be electrically connected to the second end portion EP2 of the first metal line LL through one or more second contact holes CH2 provided at the first planarization layer 115*a* overlapping with the second end portion EP2 of the first metal line LL.

Each of the one or more first dummy lines DL1 and the one or more second dummy lines DL2 according to an aspect of the present disclosure may be implemented to have an island-shaped pattern at the bending region BA of the substrate 100, and thus, may be maintained in an electrical floating state, but aspects of the present disclosure are not limited thereto.

Each of the one or more first dummy lines DL1 and the one or more second dummy lines DL2 according to another aspect of the present disclosure may be configured to electrically maintain a ground voltage. For example, each of the one or more first dummy lines DL1 and the one or more second dummy lines DL2 may be supplied with the ground voltage from the display driving circuit 140. For example, each of the one or more first dummy lines DL1 and the one or more second dummy lines DL2 may extend to be electrically connected to a ground channel of the display driving circuit 140. Accordingly, each of the one or more first dummy lines DL1 and the one or more second dummy lines DL2 maintaining the ground voltage may decrease signal interference between adjacent routing lines and may discharge static electricity flowing into the bending region BA from the outside.

Figure 10:
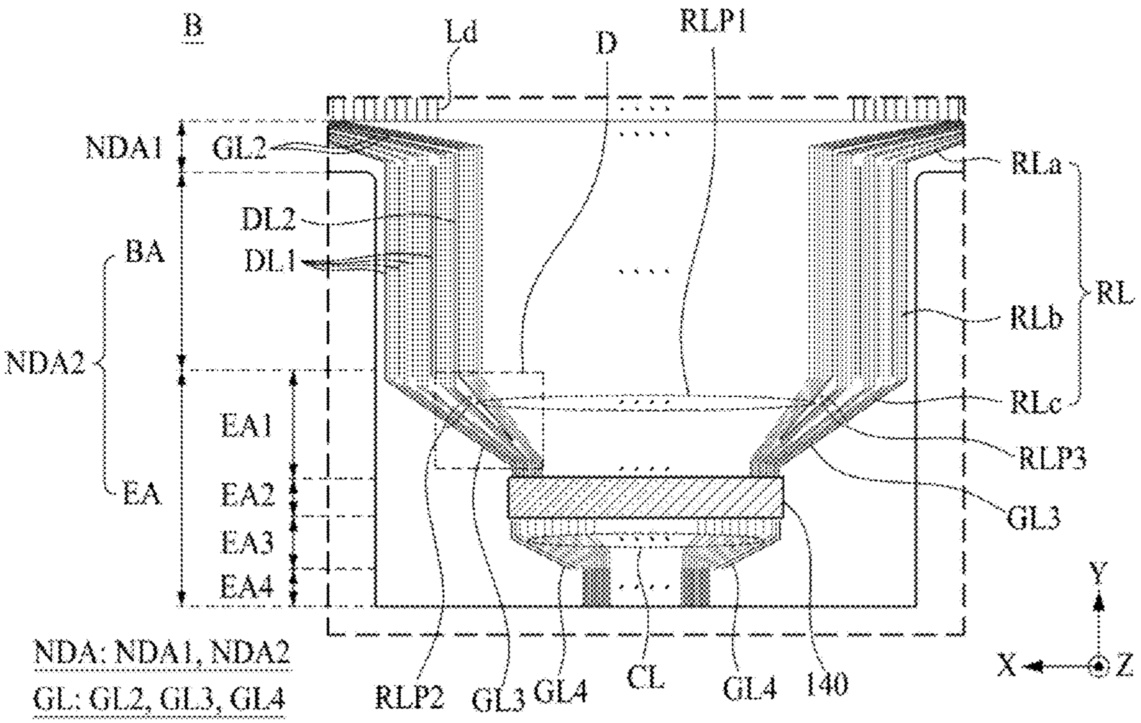
FIG. 10 is another enlarged view schematically illustrating region ‘D’ illustrated in FIG. 1.
Figure 11:
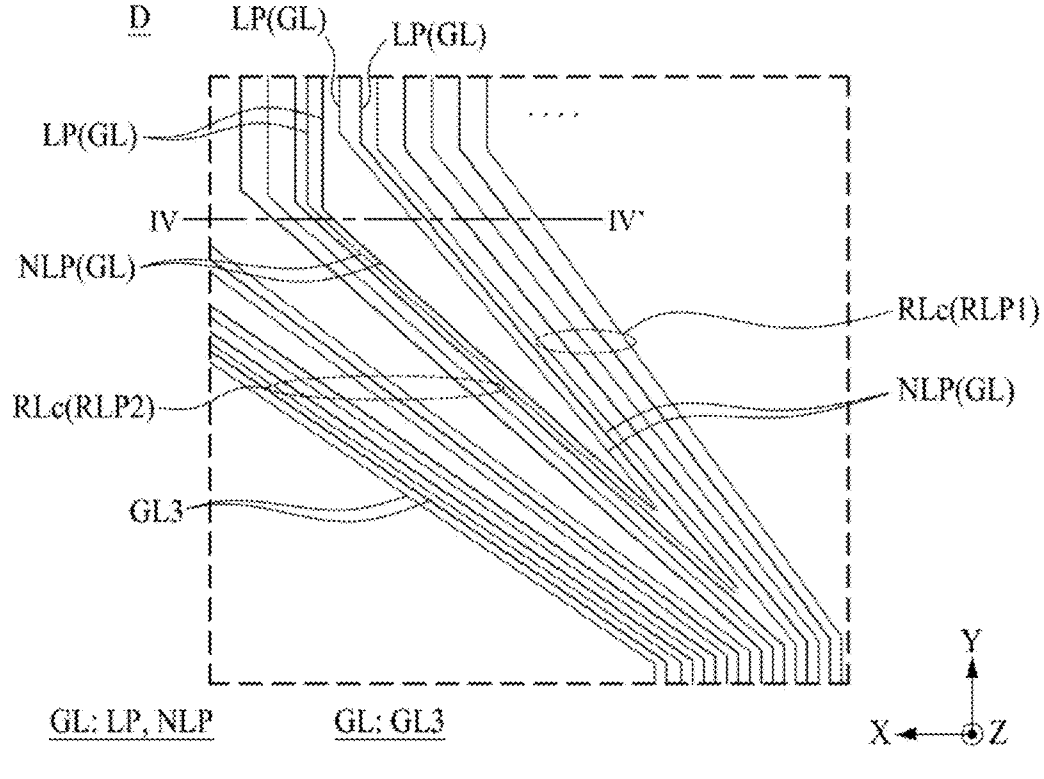
FIG. 11 is an enlarged view schematically illustrating region ‘D’ illustrated in FIG. 10.
Figure 12:
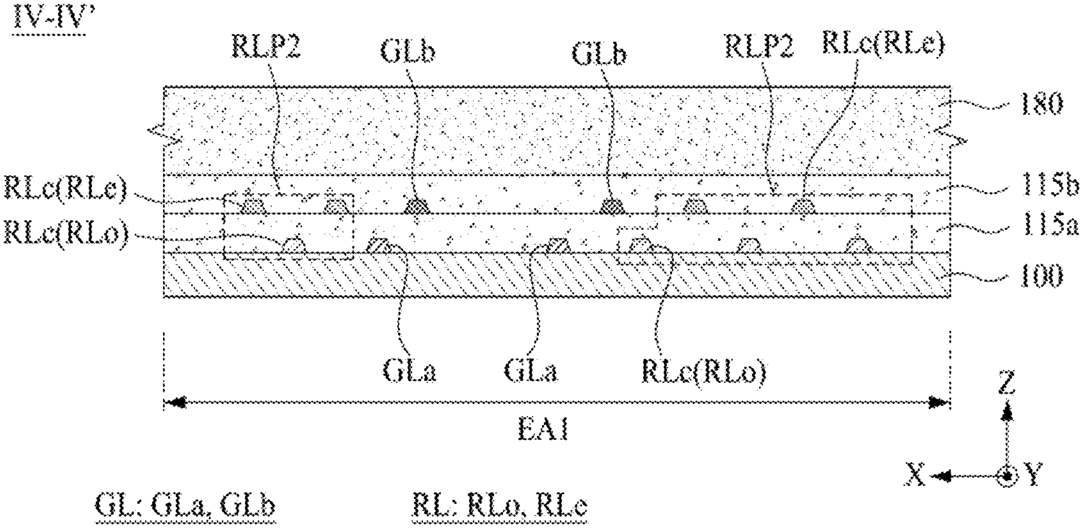
FIG. 12 is a cross-sectional view taken along line IV-IV' illustrated in FIG. 11.

FIG. 10 is another enlarged view schematically illustrating a region 'B' illustrated in FIG. 1. FIG. 11 is an enlarged view schematically illustrating a region 'D' illustrated in FIG. 10. FIG. 12 is a cross-sectional view taken along line IV-IV' illustrated in FIG. 11. FIGS. 10 to 12 are diagrams for describing an aspect where a guard line is added to a display apparatus according to another aspect of the present disclosure. In the following description, therefore, repeated descriptions of the other elements except a guard line and relevant elements are omitted or will be briefly given.

With reference to FIGS. 10 to 12 in conjunction with FIG. 1, a display apparatus 10 according to another aspect of the present disclosure may include one or more guard lines GL disposed between a plurality of routing line portions RLP1, RLP2, and RLP3. For example, the display apparatus 10 according to another aspect of the present disclosure may include one or more guard lines GL disposed between first to third routing line portions RLP1, RLP2, and RLP3.

The one or more guard lines GL may be configured to minimize or prevent the line width non-uniformity or patterning defect of a routing line occurring in a relatively wide region on the basis of a patterning speed (or an etching speed) based on an interval between adjacent routing lines RL, in performing a manufacturing process of each of a plurality of routing lines RL. For example, the one or more guard lines GL may be disposed at a relatively wide region among intervals between the plurality of routing lines RL and may minimize or prevent over-etching of an adjacent routing line RL, thereby minimizing or preventing the line width non-uniformity or patterning defect of the routing line. For example, the guard line GL may be a barrier line, a line etching prevention line, a sacrificial line, a guard pattern, a barrier pattern, a line etching prevention pattern, or a sacrificial pattern.

The one or more guard lines GL may be disposed adjacent to each of one side and the other side of the first routing line portion RLP1. For example, one or more guard lines GL may be disposed at a region between the first routing line portion RLP1 and the second routing line portion RLP2 and a region between the first routing line portion RLP1 and the third routing line portion RLP3.

The one or more guard lines GL may be disposed at a region between a third line portion RLc of the first routing line portion RLP1 and a third line portion RLc of the second routing line portion RLP2 and may be disposed at a region between the third line portion RLc of the first routing line portion RLP1 and a third line portion RLc of the third routing line portion RLP3, in a first extension region EA1 of a second non-display area NDA2 of a substrate 100. For example, the one or more guard lines GL may be disposed adjacent to each of a third line portion RLc of a first routing line and a third line portion RLc of a last routing line among a plurality of routing lines RL provided at the first routing line portion RLP1.

The one or more guard lines GL according to an aspect of the present disclosure may include a linear portion LP and a nonlinear portion NLP extending from the linear portion LP.

The linear portion LP may be configured in parallel with a second direction Y. For example, the linear portion LP may be disposed in parallel with a linear portion of the third line portion RLc of a closest routing line among the plurality of routing lines RL disposed at the first routing line portion RLP1.

The nonlinear portion NLP may extend from the linear portion LP to have a nonlinear shape, an oblique shape, or a diagonal shape. For example, the nonlinear portion NLP may extend from the linear portion LP to have a nonlinear shape, an oblique shape, or a diagonal shape along a direction between a first direction X and the second direction Y. For example, the non-linear portion NLP may be disposed in parallel with a nonlinear portion NLP of the third line portion RLc of a closest routing line of the plurality of routing lines RL provided at the first routing line portion RLP1. For example, the non-linear portion NLP may be a nonlinear line portion, an oblique portion, an oblique line portion, a diagonal portion, or a diagonal line portion.

A plurality of guard lines GL may be disposed at the first extension region EA1 of the second non-display area NDA2 of the substrate 100. The plurality of guard lines GL may be disposed at different layers. For example, when third line portions RLc of the plurality of routing lines RL are divided into odd-numbered line portions and even-numbered line portions and are disposed at different layers, any one guard line GLa of the plurality of guard lines GL may be disposed at the same layer as a third line portion RLc of a first routing line of odd-numbered routing lines RLo provided at the first routing line portion RLP1, and any one guard line GLb of the plurality of guard lines GL may be disposed at the same layer as a third line portion RLc of a first routing line of even-numbered routing lines RLe provided at the first routing line portion RLP1. Therefore, the plurality of guard lines GL may minimize or prevent over-etching of each of the third line portion RLc of the first routing line of the odd-numbered routing lines RLo provided in the first routing line portion RLP1 and the third line portion RLc of the first routing line of the even-numbered routing lines RLe provided in the first routing line portion RLP1.

According to an aspect of the present disclosure, the one or more guard lines GL disposed at the first extension region EA1 of the substrate 100 may be additionally disposed at a region adjacent to a third line portion RLc of a first routing line adjacent to a first routing line portion RLP1 among a plurality of routing lines RL provided at the second routing line portion RLP2. In addition, the one or more guard lines GL disposed at the first extension region EA1 of the substrate 100 may be additionally disposed at a region adjacent to a third line portion RLc of a first routing line adjacent to a first routing line portion RLP1 among a plurality of routing lines RL provided at the third routing line portion RLP3. Accordingly, the one or more guard lines GL may minimize or prevent over-etching of the third line portion RLc of the second routing line portion RLP2 adjacent to the first routing line portion RLP1 and the third line portion RLc of the third routing line portion RLP3.

According to an aspect of the present disclosure, the one or more guard lines GL disposed at the first extension region EA1 of the substrate 100 may be configured to be connected to one or more second dummy lines DL2 disposed at a region between the first routing line portion RLP1 and the second routing line portion RLP2 among the bending region BA of the substrate 100, but aspects of the present disclosure are not limited thereto and may be spaced apart from the one or more second dummy lines DL2. For example, the one or more guard lines GL may be connected to or may extend any one of a first metal line and a second metal line of the one or more second dummy lines DL2. For example, the linear portion LP of the one or more guard lines GL may be configured to be connected to the one or more second dummy lines DL2. For example, the linear portion LP of the one or more guard lines GL may be connected to or may extend any one of the first metal line and the second metal line of the one or more second dummy lines DL2.

The display apparatus 10 according to another aspect of the present disclosure may further include one or more second guard lines GL2.

The one or more second guard lines GL2 may be disposed at a region between the first non-display area NDA1 and the bending region BA of the substrate 100 to be adjacent to the first line portion RLa of the first routing line portion RLP1. For example, the one or more second guard lines GL2 may be disposed at the same layer as a first line portion RLa of a first routing line among the plurality of routing lines RL provided at the first routing line portion RLP1. The one or more guard lines GL may minimize or prevent over-etching of the first line portion RLa of the second routing line portion RLP2 adjacent to the first routing line portion RLP1 and the first line portion RLa of the third routing line portion RLP3.

The one or more second guard lines GL2 according to an aspect of the present disclosure may include a linear portion and a nonlinear portion extending from the linear portion.

The linear portion of the one or more second guard lines GL2 may be configured in parallel with a second direction Y. For example, the linear portion of the one or more second guard lines GL2 may be disposed in parallel with a linear portion of the first line portion RLa of a closest routing line among the plurality of routing lines RL provided at the first routing line portion RLP.

The nonlinear portion of the one or more second guard lines GL2 may extend from the linear portion to have a nonlinear shape, an oblique shape, or a diagonal shape. For example, the nonlinear portion of the one or more second guard lines GL2 may extend from the linear portion to have a nonlinear shape, an oblique shape, or a diagonal shape along a direction between the first direction X and the second direction Y. For example, the non-linear portion of the one or more second guard lines GL2 may be disposed in parallel with a nonlinear portion of the first line portion RLa of a closest routing line of the plurality of routing lines RL provided at the first routing line portion RLP1.

According to an aspect of the present disclosure, the one or more second guard lines GL2 disposed at the first non-display area NDA1 of the substrate 100 may be additionally disposed at a region adjacent to a first line portion RLa of a first routing line adjacent to a first routing line portion RLP1 among a plurality of routing lines RL provided at the second routing line portion RLP2. In addition, the one or more second guard lines GL2 disposed at the first non-display area NDA1 of the substrate 100 may be additionally disposed at a region adjacent to a first line portion RLa of a first routing line adjacent to a first routing line portion RLP1 among a plurality of routing lines RL provided at the third routing line portion RLP3. Accordingly, the one or more second guard lines GL2 may minimize or prevent over-etching of the first line portion RLa of the second routing line portion RLP2 adjacent to the first routing line portion RLP1 and the first line portion RLa of the third routing line portion RLP3.

According to an aspect of the present disclosure, the one or more second guard lines GL2 disposed at the first non-display area NDA1 of the substrate 100 may be configured to be connected to one or more second dummy lines DL2 disposed at a region between the first routing line portion RLP1 and the second routing line portion RLP2 among the bending region BA of the substrate 100, but aspects of the present disclosure are not limited thereto and may be spaced apart from the one or more second dummy lines DL2. For example, the one or more second guard lines GL2 may be connected to or may extend any one of the first metal line and the second metal line of the one or more second dummy lines DL2. For example, the linear portion of the one or more second guard lines GL2 may be configured to be connected to the one or more second dummy lines DL2. For example, the linear portion of the one or more second guard lines GL2 may be connected to or may extend any one of the first metal line and the second metal line of the one or more second dummy lines DL2.

The display apparatus 10 according to another aspect of the present disclosure may further include one or more third guard lines GL3.

The one or more third guard lines GL3 may be disposed at a region adjacent to each of a first routing line and a last routing line of a plurality of routing lines RL. The one or more third guard lines GL3 may be disposed at the region adjacent to each of the first routing line and the last routing line of the plurality of routing lines RL provided at the first extension region EA1 and the bending region BA and the first non-display area NDA1 of the substrate 100. For example, the one or more third guard lines GL3 may be disposed at a region between the first routing line and a lateral surface of the substrate 100 and may be disposed at a region between the last routing line and the lateral surface of the substrate 100.

The one or more third guard lines GL3 may be disposed in parallel with each of the first routing line and the last routing line, and thus, may have the same shape as that of each of the first routing line and the last routing line. For example, the one or more third guard lines GL3 may include a first nonlinear portion at the first non-display area NDA1 of the substrate 100, a linear portion at the bending region BA of the substrate 100, and a second nonlinear portion at the first extension region EA1 of the substrate 100. For example, the first nonlinear portion, the linear portion, and the second nonlinear portion may include one line shape which connects continuously.

As described above, the one or more third guard lines GL3 may minimize or prevent over-etching of each of the first routing line and the last routing line of the plurality of routing lines RL.

The display apparatus 10 according to another aspect of the present disclosure may further include one or more fourth guard lines GL4.

The one or more fourth guard lines GL4 may be disposed at a region adjacent to each of a first pad connection line and a last pad connection line of a plurality of pad connection lines CL. The one or more fourth guard lines GL4 may be disposed at the region adjacent to each of the first pad connection line and the last pad connection line of the plurality of pad connection lines CL provided at a third extension region EA3 of the substrate 100. For example, the one or more fourth guard lines GL4 may be disposed at a region between the first pad connection line and a lateral surface of the substrate 100 and may be disposed at a region between a last pad connection line and the lateral surface of the substrate 100.

The one or more fourth guard lines GL4 may be disposed in parallel with each of the first pad connection line and the last pad connection line, and thus, may have the same shape as that of each of the first pad connection line and the last pad connection line. For example, the one or more fourth guard lines GL4 may include a linear portion and a nonlinear portion extending from the linear portion.

The linear portion of the one or more fourth guard lines GL4 may be configured in parallel with the second direction Y. For example, the linear portion of the one or more fourth guard lines GL4 may be disposed in parallel with a linear portion of each of the first pad connection line and the last pad connection line.

The nonlinear portion of the one or more fourth guard lines GL4 may extend from the linear portion to have a nonlinear shape, an oblique shape, or a diagonal shape. For example, the nonlinear portion of the one or more fourth guard lines GL4 may extend from the linear portion in a nonlinear shape, an oblique shape, or a diagonal shape along a direction between the first direction X and the second direction Y. For example, the non-linear portion of the one or more fourth guard lines GL4 may be disposed in parallel with a nonlinear portion of each of the first pad connection line and the last pad connection line.

As described above, the one or more fourth guard lines GL4 may minimize or prevent over-etching of each of the first pad connection line and the last pad connection line of the plurality of pad connection lines.

Figure 13A:
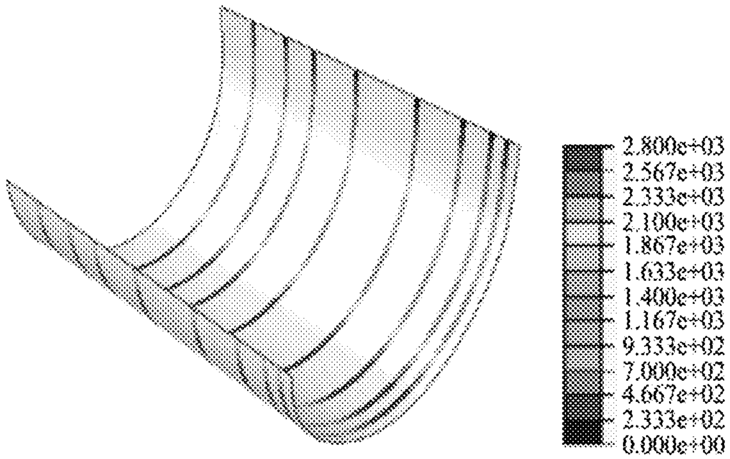
FIG. 13A PRIOR ART
FIG. 13A is a diagram illustrating a bending stress applied to a bending region of a display apparatus according to an experiment example.
Figure 13B:
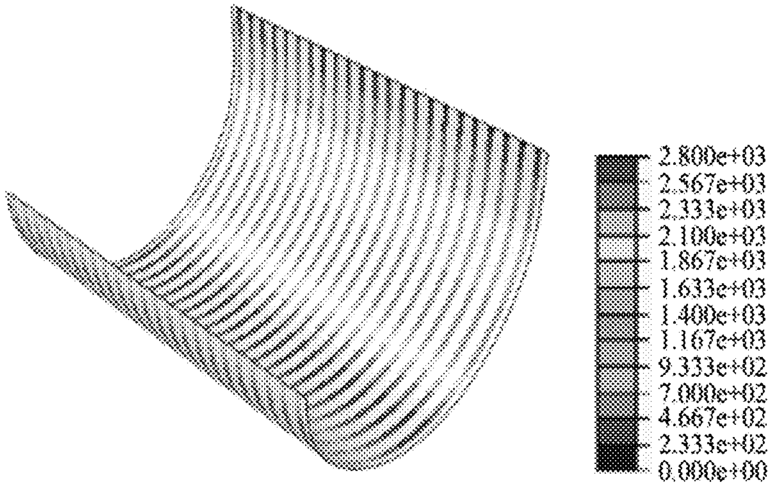
FIG. 13B is a diagram illustrating a bending stress applied to a bending region of a display apparatus according to an aspect of the present disclosure.

FIG. 13A is a diagram illustrating a bending stress applied to a bending region of a display apparatus according to an experiment example. FIG. 13B is a diagram illustrating a bending stress applied to a bending region of a display apparatus according to an aspect of the present disclosure. The display apparatus according to an aspect of the present disclosure may include routing lines and dummy lines disposed at the same intervals in a bending region, and the display apparatus according to the experiment example may include routing lines which are disposed in a wide interval and routing lines which are disposed in a narrow interval at a bending region.

According to FIG. 13A, in the display apparatus according to the experiment example, a maximum bending stress applied to a bending region bent in a curved shape has been measured to be 2,749 MPa (Mega Pascal). According to FIG. 13B, in the display apparatus according to an aspect of the present disclosure, a maximum bending stress applied to a bending region bent in a curved shape has been measured to be 2,634 MPa.

Comparing with the display apparatus according to the experiment example, in the display apparatus according to an aspect of the present disclosure, the maximum bending stress applied to the bending region bent in a curved shape may decrease by about 115 MPa. Accordingly, in the display apparatus according to an aspect of the present disclosure, because a bending stress applied in bending of the bending region is reduced, a crack or disconnection of a routing line occurring due to the concentration of local bending stress may be minimized or prevented.

A display apparatus according to an aspect of the present disclosure will be described below.

A display apparatus according to some aspects of the present disclosure may comprise a substrate including a display area, a first non-display area surrounding the display area, and a second non-display area having a bending region extending from at least a portion of the first non-display area; a pixel part including a plurality of pixels at the display area of the substrate; a gate driving circuit disposed at the first non-display area of the substrate and electrically connected to the pixel part; a first routing line portion including a plurality of first routing lines electrically connected to the pixel part and configured to pass through the bending region; and a second routing line portion including a plurality of second routing lines electrically connected to the gate driving circuit and configured to pass through the bending region, wherein the second routing line portion comprises a plurality of routing groups including one or more second routing lines of the plurality of second routing lines; and a dummy line portion disposed at a bending region between the plurality of routing groups, the dummy line portion including one or more dummy lines.

According to some aspects of the present disclosure, the one or more dummy lines may comprise a plurality of micro dummy lines, and an interval between the plurality of first routing lines, an interval between the plurality of second routing lines, and an interval between the plurality of micro dummy lines may be equal to one another.

According to some aspects of the present disclosure, each of the plurality of first routing lines and the plurality of second routing lines may comprise one or more micro-lines, the one or more dummy lines may comprise a plurality of micro-dummy lines, and an interval between micro-lines of each of the plurality of first routing lines and an interval between micro-lines of each of the plurality of second routing lines may be equal to an interval between the plurality of micro dummy lines.

According to some aspects of the present disclosure, each of the plurality of first routing lines, the plurality of second routing lines, and the plurality of micro dummy lines, disposed at the bending region, may comprise a first metal line disposed on the substrate; and a second metal line disposed on the first metal line, and the first metal line and the second metal line may be electrically connected to each other.

According to some aspects of the present disclosure, the first metal line may directly contact an upper surface of the substrate.

According to some aspects of the present disclosure, the second non-display area may further comprise an extension region extending from the bending region, the one or more dummy lines may comprise a first reinforcement portion disposed at the first non-display area and connected to one end of each of the plurality of micro dummy lines; and a second reinforcement portion disposed at the extension region and connected to the other end of each of the plurality of micro dummy lines.

According to some aspects of the present disclosure, the one or more dummy lines may further comprise a first neck portion connected between one end of each of the plurality of micro dummy lines and the first reinforcement portion, the first neck portion having a line width which is smaller than each of the plurality of micro dummy lines; and a second neck portion connected between one end of each of the plurality of micro dummy lines and the second reinforcement portion, the second neck portion having a line width which is smaller than each of the plurality of micro dummy lines.

According to some aspects of the present disclosure, the one or more dummy lines may comprise a first metal line disposed on the substrate, and a second metal line disposed on the first metal line and electrically connected to the first metal line, and each of the first metal line and the second metal line may comprise the micro dummy line, the first reinforcement portion, and the second reinforcement portion.

According to some aspects of the present disclosure, the display apparatus may further comprise an insulation layer between the first metal line and the second metal line, the first reinforcement portion of the first metal line may be coupled to the first reinforcement portion of the second metal line through one or more first contact holes provided at the insulation layer, and the second reinforcement portion of the first metal line may be coupled to the second reinforcement portion of the second metal line through one or more second contact holes provided at the insulation layer.

According to some aspects of the present disclosure, the display apparatus may further comprise one or more guard lines disposed at one or more of the first non-display area and the second non-display area of the substrate and between the first routing line portion and the second routing line portion.

According to some aspects of the present disclosure, the dummy line portion may further comprise one or more second dummy lines disposed between the first routing line portion and the second routing line portion.

According to some aspects of the present disclosure, the one or more second dummy lines may comprise a plurality of micro-lines disposed to have the same interval as an interval between the plurality of first routing lines.

A display apparatus according to some aspects of the present disclosure may comprise a substrate including a display area and a non-display area; a pixel part including a plurality of pixels at the display area of the substrate; a gate driving circuit disposed at the non-display area of the substrate and electrically connected to the pixel part; a first routing line portion including a plurality of first routing lines disposed at the non-display area of the substrate and electrically connected to the pixel part; a second routing line portion including a plurality of second routing lines disposed at the non-display area of the substrate and electrically connected to the gate driving circuit; and a guard line disposed at the non-display area of the substrate and between the first routing line portion and the second routing line portion.

According to some aspects of the present disclosure, the guard line may comprise a linear portion and a nonlinear portion extending from the linear portion.

According to some aspects of the present disclosure, the non-display area of the substrate may comprise a first non-display area surrounding the display area; and a second non-display area including a bending region extending from at least a portion of the first non-display area, a first extension region extending from the bending region, and a second extension region extending from the first extension region, and the guard line may be disposed at the first extension region between the first routing line portion and the second routing line portion.

According to some aspects of the present disclosure, the display apparatus may further comprise a second guard line disposed at the first non-display area between the first routing line portion and the second routing line portion.

According to some aspects of the present disclosure, the non-display area of the substrate may comprise a first non-display area surrounding the display area; and a second non-display area extending from one side of the first non-display area and including a bending region, a nonlinear portion of the guard line may be disposed at the first non-display area, and a linear portion of the guard line may be disposed at the bending region.

According to some aspects of the present disclosure, the second non-display area may comprise the bending region extending from one side of the first non-display area; and a first extension region extending from the bending region, and the guard line may further comprise a second nonlinear portion disposed at the first extension region.

According to some aspects of the present disclosure, the display apparatus may further comprise a display driving circuit at the non-display area; and a pad part including a plurality of pads at the non-display area and electrically connected to the display driving circuit through a plurality of pad connection lines, each of the first routing line portion, the second routing line portion, and the guard line may be disposed between the display area and the display driving circuit.

According to some aspects of the present disclosure, the display apparatus may further comprise one or more of a third guard line and a fourth guard line, the third guard line may be disposed between a lateral surface of the substrate and the second routing line, and the fourth guard line may be disposed adjacent to each of a first pad connection line and a last pad connection line of the plurality of pad connection lines.

The display apparatus according to an aspect of the present disclosure may be applied to mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like.

It will be apparent to those skilled in the art that various modifications and variations can be made in the display apparatus of the present disclosure without departing from the spirit or scope of the aspects. Thus, it is intended that the present disclosure covers the modifications and variations of the aspects provided they come within the scope of the appended claims and their equivalents.

What is claimed is:

1. A display apparatus, comprising:
- a substrate including a display area, a first non-display area surrounding the display area, and a second non-display area having a bending region extending from at least a portion of the first non-display area;
- a pixel part including a plurality of pixels at the display area of the substrate;
- a gate driving circuit disposed at the first non-display area of the substrate and electrically connected to the pixel part;
- a first routing line portion including a plurality of first routing lines electrically connected to the pixel part and configured to pass through the bending region; and
- a second routing line portion including a plurality of second routing lines electrically connected to the gate driving circuit and configured to pass through the bending region, wherein:

the second routing line portion includes:
- a plurality of routing groups including one or more second routing lines of the plurality of second routing lines; and
- a dummy line portion disposed at the bending region between the plurality of routing groups, the dummy line portion including one or more dummy lines;

the one or more dummy lines comprise a plurality of micro dummy lines;

an interval among the plurality of first routing lines, an interval among the plurality of second routing lines, and an interval among the plurality of micro dummy lines are equal to one another:

each of the plurality of first routing lines, the plurality of second routing lines, and the plurality of micro dummy lines, disposed in the bending region, comprises:
- a first metal line disposed on the substrate; and
- a second metal line disposed on the first metal line; and the first metal line and the second metal line are electrically connected to each other.

2. The display apparatus of claim 1, wherein each of the plurality of first routing lines and the plurality of second routing lines comprises one or more micro lines, and wherein an interval between two adjacent micro lines of the plurality of first routing lines and an interval between two adjacent micro lines of the plurality of second routing lines are equal to an interval among the plurality of micro dummy lines.

3. The display apparatus of claim 1, wherein the first metal line directly contacts an upper surface of the substrate.

4. The display apparatus of claim 1, wherein the second non-display area further includes an extension region extending from the bending region, and wherein the one or more dummy lines comprise:

a first reinforcement portion disposed at the first non-display area and connected to one end of each of the plurality of micro dummy lines; and a second reinforcement portion disposed at the extension region and connected to the other end of each of the plurality of micro dummy lines.

5. The display apparatus of claim 4, wherein the one or more dummy lines further comprise:

a first neck portion connected between one end of each of the plurality of micro dummy lines and the first reinforcement portion, the first neck portion having a line width smaller than each of the plurality of micro dummy lines; and a second neck portion connected between one end of each of the plurality of micro dummy lines and the second reinforcement portion, the second neck portion having a line width smaller than each of the plurality of micro dummy lines.

6. The display apparatus of claim 1, further comprising one or more guard lines disposed at one or more of the first non-display area and the second non-display area of the substrate and between the first routing line portion and the second routing line portion.

7. The display apparatus of claim 1, wherein the dummy line portion further comprises one or more second dummy lines disposed between the first routing line portion and the second routing line portion.

8. The display apparatus of claim 7, wherein the one or more second dummy lines comprise a plurality of micro lines disposed to have a same interval as an interval among the plurality of first routing lines.

9. A display apparatus, comprising:

a substrate including a display area, a first non-display area surrounding the display area, and a second non-display area having a bending region extending from at least a portion of the first non-display area;

a pixel part including a plurality of pixels at the display area of the substrate;

a gate driving circuit disposed at the first non-display area of the substrate and electrically connected to the pixel part;

a first routing line portion including a plurality of first routing lines electrically connected to the pixel part and configured to pass through the bending region; and a second routing line portion including a plurality of second routing lines electrically connected to the gate driving circuit and configured to pass through the bending region, wherein:

the second routing line portion includes:

a plurality of routing groups including one or more second routing lines of the plurality of second routing lines; and a dummy line portion disposed at the bending region between the plurality of routing groups, the dummy line portion including one or more dummy lines;

the one or more dummy lines comprise a plurality of micro dummy lines;

an interval among the plurality of first routing lines, an interval among the plurality of second routing lines, and an interval among the plurality of micro dummy lines are equal to one another;

the second non-display area further includes an extension region extending from the bending region;

the one or more dummy lines comprise:

a first reinforcement portion disposed at the first non-display area and connected to one end of each of the plurality of micro dummy lines;

a second reinforcement portion disposed at the extension region and connected to the other end of each of the plurality of micro dummy lines;

a first metal line disposed on the substrate; and a second metal line disposed on the first metal line and electrically connected to the first metal line; and each of the first metal line and the second metal line comprises the micro dummy line, the first reinforcement portion, and the second reinforcement portion.

10. The display apparatus of claim 9, further comprising an insulation layer between the first metal line and the second metal line, wherein the first reinforcement portion of the first metal line is coupled to the first reinforcement portion of the second metal line through one or more first contact holes provided at the insulation layer, and wherein the second reinforcement portion of the first metal line is coupled to the second reinforcement portion of the second metal line through one or more second contact holes provided at the insulation layer.

11. A display apparatus, comprising:

a substrate including a display area and a non-display area, the non-display area comprising a first non-display area surrounding the display area and a second non-display area including a bending region extending from the first non-display area, a first extension region extending from the bending region, and a second extension region extending from the first extension region;

a pixel part including a plurality of pixels at the display area of the substrate;

a gate driving circuit disposed at the non-display area of the substrate and electrically connected to the pixel part;

a first routing line portion including a plurality of first routing lines disposed at the non-display area of the substrate and electrically connected to the pixel part;

a second routing line portion including a plurality of second routing lines disposed at the non-display area of the substrate and electrically connected to the gate driving circuit; and a first guard line disposed in the non-display area of the substrate and between the first routing line portion and the second routing line portion, wherein the first guard line includes a linear portion disposed in the bending region and a first nonlinear portion extending from the linear portion and disposed in the first extension region.

12. The display apparatus of claim 11, further comprising a second guard line disposed in the first non-display area between the first routing line portion and the second routing line portion.

13. The display apparatus of claim 11, wherein the first guard line further includes a second nonlinear portion extending from the linear portion and disposed in the first non-display area.

14. The display apparatus of claim 11, further comprising:

a display driving circuit in the non-display area; and a pad part including a plurality of pads at the non-display area and electrically connected to the display driving circuit through a plurality of pad connection lines, wherein each of the first routing line portion, the second routing line portion, and the first guard line is disposed between the display area and the display driving circuit.

15. The display apparatus of claim 14, further comprising one or more of a third guard line and a fourth guard line, wherein the third guard line is disposed between a lateral surface of the substrate and the second routing line, and wherein the fourth guard line is disposed adjacent to each of a first pad connection line and a last pad connection line of the plurality of pad connection lines.

16. The display apparatus of claim 11, wherein the second routing line portion comprises:

a plurality of routing groups including one or more second routing lines of the plurality of second routing lines; and a dummy line portion disposed at the bending region among the plurality of routing groups, the dummy line portion including one or more dummy lines.

17. The display apparatus of claim 16, wherein the one or more dummy lines comprise a plurality of micro dummy lines, and wherein an interval between the plurality of first routing lines, an interval among the plurality of second routing lines, and an interval among the plurality of micro dummy lines are equal to one another.

* * * * *